United States Patent
Busayarat et al.

(10) Patent No.: US 11,979,474 B2
(45) Date of Patent: May 7, 2024

(54) RESOURCE RESPONSE EXPANSION

(71) Applicant: Home Box Office, Inc., New York, NY (US)

(72) Inventors: Sata Busayarat, Seattle, WA (US); Allen Arthur Gay, Shoreline, WA (US); Brandon C. Furtwangler, Issaquah, WA (US); Steven N. Furtwangler, Okemos, MI (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 16/818,109

(22) Filed: Mar. 13, 2020

(65) Prior Publication Data
US 2020/0213411 A1    Jul. 2, 2020

Related U.S. Application Data

(63) Continuation of application No. 15/285,439, filed on Oct. 4, 2016, now Pat. No. 10,623,514.
(Continued)

(51) Int. Cl.
*H04L 67/568* (2022.01)
*G06F 16/951* (2019.01)
(Continued)

(52) U.S. Cl.
CPC .......... *H04L 67/568* (2022.05); *G06F 16/951* (2019.01); *G06T 1/20* (2013.01);
(Continued)

(58) Field of Classification Search
CPC .......... H04N 21/4821; H04N 21/4332; H04N 21/251; H04N 21/4826; H04N 21/43;
(Continued)

(56) References Cited

U.S. PATENT DOCUMENTS 6,025,837 A    2/2000  Matthews, III et al.
7,302,430 B1   11/2007 Nagda et al.
(Continued)

FOREIGN PATENT DOCUMENTS

EP    0 848 554 A2   6/1998
WO    97/13368 A1    4/1997
(Continued)

OTHER PUBLICATIONS

Stack Overflow, What does it mean to hydrate an object?, Aug. 9, 2011 and Dec. 23, 2013, https://stackoverflow.com/questions/6991135/what-does-it-mean-to-hydrate-an-object/20787106#20787106 Accessed Apr. 14, 2021 (Year: 2011).*
(Continued)

*Primary Examiner* — Michael R Telan
(74) *Attorney, Agent, or Firm* — Amin, Turocy & Watson, LLP

(57) ABSTRACT

The described technology is directed towards returning expanded data, beyond the data that was specifically requested, to a client, in order to reduce or eliminate likely subsequent requests for more data. Client requests for data items are processed by expansion rule logic to find an expansion rule set (e.g., file) corresponding to the identified data item. The rule set is used to expand requests for certain data items into expanded requests that return more data items than those requested. Client devices receive, cache and (often) use the cached expanded data items, which thereby reduces the overall number of requests to the data service. Expansion rules may be based upon observations (e.g., machine learned and/or manual) of request patterns, so as to reasonably predict which data item or items clients will likely next need, and return those as expanded data items in anticipation of their need.

20 Claims, 13 Drawing Sheets

Related U.S. Application Data

(60) Provisional application No. 62/240,888, filed on Oct. 13, 2015.

(51) Int. Cl.

| | | |
|---|---|---|
| *G06T 1/20* | (2006.01) | |
| *G06T 1/60* | (2006.01) | |
| *G06T 11/20* | (2006.01) | |
| *H04L 41/5054* | (2022.01) | |
| *H04L 43/045* | (2022.01) | |
| *H04L 43/10* | (2022.01) | |
| *H04L 43/55* | (2022.01) | |
| *H04L 65/1045* | (2022.01) | |
| *H04L 67/00* | (2022.01) | |
| *H04L 67/01* | (2022.01) | |
| *H04L 67/02* | (2022.01) | |
| *H04L 67/10* | (2022.01) | |
| *H04L 67/51* | (2022.01) | |
| *H04L 67/56* | (2022.01) | |
| *H04L 67/566* | (2022.01) | |
| *H04L 67/5682* | (2022.01) | |
| *H04L 67/60* | (2022.01) | |
| *H04N 21/25* | (2011.01) | |
| *H04N 21/43* | (2011.01) | |
| *H04N 21/433* | (2011.01) | |
| *H04N 21/482* | (2011.01) | |

(52) U.S. Cl.
CPC .............. *G06T 1/60* (2013.01); *G06T 11/206* (2013.01); *H04L 41/5054* (2013.01); *H04L 43/045* (2013.01); *H04L 43/10* (2013.01); *H04L 43/55* (2022.05); *H04L 65/1045* (2022.05); *H04L 67/01* (2022.05); *H04L 67/02* (2013.01); *H04L 67/10* (2013.01); *H04L 67/34* (2013.01); *H04L 67/51* (2022.05); *H04L 67/56* (2022.05); *H04L 67/566* (2022.05); *H04L 67/5682* (2022.05); *H04L 67/60* (2022.05); *H04N 21/251* (2013.01); *H04N 21/43* (2013.01); *H04N 21/4332* (2013.01); *H04N 21/4821* (2013.01); *H04N 21/4826* (2013.01)

(58) Field of Classification Search
CPC ............... H04L 67/2842; H04L 67/568; H04L 41/5054; H04L 43/045; H04L 43/10; H04L 43/55; H04L 65/1045; H04L 67/01; H04L 67/02; H04L 67/10; H04L 67/34; H04L 67/51; H04L 67/56; H04L 67/566; H04L 67/5682; H04L 67/60; G06F 3/0482; G06F 3/04842; G06F 16/951; G06T 1/20; G06T 1/60; G06T 11/206
See application file for complete search history.

(56) References Cited

U.S. PATENT DOCUMENTS

| | | | |
|---|---|---|---|
| 7,373,459 B2 | 5/2008 | Aoki et al. | |
| 7,383,535 B1 | 6/2008 | Kshetrapal et al. | |
| 7,620,653 B1 | 11/2009 | Swartz | |
| 7,689,723 B1 | 3/2010 | DiMambro | |
| 7,769,805 B1* | 8/2010 | Barnes ................ | G06F 16/9574 709/203 |
| 7,793,206 B2 | 9/2010 | Lim et al. | |
| 7,978,631 B1 | 7/2011 | Abdelaziz et al. | |
| 8,725,849 B1 | 5/2014 | Lloyd | |
| 8,849,825 B1 | 9/2014 | McHugh et al. | |
| 8,949,161 B2* | 2/2015 | Borst ................ | G06F 16/24552 706/45 |
| 8,990,869 B2* | 3/2015 | Hasek ................ | H04L 67/2823 725/92 |
| 9,031,995 B1 | 5/2015 | Raden, II et al. | |
| 9,166,862 B1 | 10/2015 | Davis et al. | |
| 9,189,220 B2 | 11/2015 | Gill et al. | |
| 9,294,796 B2 | 3/2016 | McDonough et al. | |
| 9,313,024 B1 | 4/2016 | Stute | |
| 9,419,852 B1 | 8/2016 | Heller et al. | |
| 9,454,356 B2 | 9/2016 | Qin | |
| 9,667,515 B1 | 5/2017 | Thimsen et al. | |
| 9,710,247 B2 | 7/2017 | Conlan et al. | |
| 9,747,382 B1 | 8/2017 | Warman et al. | |
| 9,817,646 B1 | 11/2017 | Chen et al. | |
| 9,875,262 B2 | 1/2018 | McHugh et al. | |
| 9,887,885 B2 | 2/2018 | Varney et al. | |
| 9,891,938 B2 | 2/2018 | Barry et al. | |
| 9,894,119 B2 | 2/2018 | Pearl et al. | |
| 9,928,308 B1 | 3/2018 | Tsun et al. | |
| 9,953,036 B2* | 4/2018 | Mackenzie ........... | G06F 16/178 |
| 10,013,500 B1 | 7/2018 | McClintock et al. | |
| 10,028,011 B2* | 7/2018 | Yao ..................... | H04N 21/4331 |
| 10,042,626 B2 | 8/2018 | Nekrestyanov et al. | |
| 10,148,762 B2 | 12/2018 | Rogers et al. | |
| 10,191,954 B1* | 1/2019 | Corley ................. | G06F 16/258 |
| 10,277,704 B2 | 4/2019 | Busayarat et al. | |
| 10,320,879 B2 | 6/2019 | Nekrestyanov et al. | |
| 10,884,589 B2 | 1/2021 | Pike et al. | |
| 10,949,191 B2 | 3/2021 | Chen | |
| 2001/0034771 A1 | 10/2001 | Hutsch et al. | |
| 2002/0143591 A1 | 10/2002 | Connelly | |
| 2003/0037206 A1 | 2/2003 | Benfield et al. | |
| 2003/0038836 A1 | 2/2003 | Ronald et al. | |
| 2003/0039230 A1 | 2/2003 | Ostman et al. | |
| 2003/0097357 A1 | 5/2003 | Ferrari et al. | |
| 2003/0191753 A1 | 10/2003 | Hoch | |
| 2004/0082352 A1 | 4/2004 | Keating et al. | |
| 2004/0098744 A1 | 5/2004 | Gutta | |
| 2004/0128618 A1* | 7/2004 | Datta ................. | G06F 16/9574 715/234 |
| 2004/0139480 A1 | 7/2004 | Delpuch et al. | |
| 2005/0027871 A1 | 2/2005 | Bradley et al. | |
| 2005/0289168 A1 | 12/2005 | Green et al. | |
| 2006/0026655 A1 | 2/2006 | Perez | |
| 2006/0236221 A1 | 10/2006 | McCausland et al. | |
| 2007/0130163 A1 | 6/2007 | Perez et al. | |
| 2008/0040683 A1* | 2/2008 | Walsh ................. | G06F 3/04855 715/786 |
| 2008/0186276 A1* | 8/2008 | Mayer-Ullmann ...... | G06F 9/451 345/158 |
| 2009/0125809 A1 | 5/2009 | Trapani et al. | |
| 2009/0138441 A1 | 5/2009 | Valentine et al. | |
| 2009/0164414 A1 | 6/2009 | Tatzel et al. | |
| 2009/0193044 A1 | 7/2009 | Buehrer et al. | |
| 2009/0210868 A1 | 8/2009 | Parthasarathy | |
| 2009/0282432 A1 | 11/2009 | Hahnefeld et al. | |
| 2010/0058390 A1* | 3/2010 | Harris ................ | H04N 21/466 725/44 |
| 2010/0063878 A1 | 3/2010 | Bachet et al. | |
| 2010/0070447 A1 | 3/2010 | Pfuntner et al. | |
| 2010/0229045 A1 | 9/2010 | Schultz et al. | |
| 2010/0257204 A1 | 10/2010 | Orlov et al. | |
| 2011/0099277 A1* | 4/2011 | Yao ..................... | H04L 67/2842 709/226 |
| 2011/0145327 A1 | 6/2011 | Stewart | |
| 2011/0184899 A1* | 7/2011 | Gadanho .......... | H04N 21/26283 706/46 |
| 2011/0239243 A1* | 9/2011 | Dierks ................. | H04N 21/812 725/24 |
| 2011/0246471 A1 | 10/2011 | Rakib | |
| 2011/0289458 A1 | 11/2011 | Yu et al. | |
| 2011/0289533 A1 | 11/2011 | White et al. | |
| 2011/0314326 A1 | 12/2011 | Mahajan et al. | |
| 2012/0174158 A1* | 7/2012 | Mowrey .......... | H04N 21/42202 725/40 |
| 2012/0197908 A1 | 8/2012 | Unno | |
| 2012/0215684 A1 | 8/2012 | Kidron | |
| 2012/0313966 A1* | 12/2012 | Kamekawa ........... | G06F 3/0482 345/619 |
| 2013/0024851 A1 | 1/2013 | Firman et al. | |
| 2013/0031204 A1 | 1/2013 | Graham et al. | |

(56) References Cited

U.S. PATENT DOCUMENTS

| | | |
|---|---|---|
| 2013/0046849 A1 | 2/2013 | Wolf et al. |
| 2013/0124309 A1* | 5/2013 | Traasdahl ............ G06F 9/5027 705/14.49 |
| 2013/0346539 A1 | 12/2013 | Sivasubramanian et al. |
| 2013/0347018 A1* | 12/2013 | Limp ................ H04N 21/4394 725/19 |
| 2014/0006951 A1 | 1/2014 | Hunter |
| 2014/0040301 A1 | 2/2014 | Chadha et al. |
| 2014/0047073 A1 | 2/2014 | Beme |
| 2014/0181137 A1 | 6/2014 | Stein |
| 2014/0201802 A1* | 7/2014 | Boss ....................... H04N 5/50 725/134 |
| 2014/0223099 A1 | 8/2014 | Kidron |
| 2014/0223303 A1 | 8/2014 | Cox et al. |
| 2014/0280108 A1 | 9/2014 | Dunn et al. |
| 2014/0344663 A1 | 11/2014 | Joel et al. |
| 2015/0026238 A1 | 1/2015 | Natarajan |
| 2015/0040098 A1 | 2/2015 | Akins et al. |
| 2015/0051749 A1 | 2/2015 | Green et al. |
| 2015/0149544 A1 | 5/2015 | Zhang |
| 2015/0195621 A1* | 7/2015 | Harron ................ H04N 21/454 725/46 |
| 2015/0201001 A1 | 7/2015 | Cabanillas et al. |
| 2015/0201033 A1* | 7/2015 | Gupta ................ H04L 67/2842 709/213 |
| 2015/0220326 A1 | 8/2015 | Jia |
| 2015/0220649 A1 | 8/2015 | Papa et al. |
| 2015/0235275 A1* | 8/2015 | Shah ................. G06Q 30/0269 705/14.66 |
| 2015/0256903 A1* | 9/2015 | Walker ................ H04L 65/613 725/32 |
| 2015/0269146 A1 | 9/2015 | Ayyar et al. |
| 2015/0277710 A1* | 10/2015 | Lee ...................... G06F 3/0488 715/822 |
| 2015/0278219 A1 | 10/2015 | Phipps |
| 2015/0304447 A1 | 10/2015 | Karp et al. |
| 2015/0358818 A1* | 12/2015 | Dipaola ............ G06Q 30/0261 726/4 |
| 2015/0378685 A1 | 12/2015 | Kaplinger et al. |
| 2016/0006645 A1 | 1/2016 | Rave |
| 2016/0070447 A1 | 3/2016 | Righter et al. |
| 2016/0085772 A1 | 3/2016 | Vermeulen et al. |
| 2016/0086260 A1 | 3/2016 | Vermeulen et al. |
| 2016/0105710 A1 | 4/2016 | Watson et al. |
| 2016/0110412 A1 | 4/2016 | Sun et al. |
| 2016/0140002 A1 | 5/2016 | Fee et al. |
| 2016/0191985 A1* | 6/2016 | Tirpak ............... H04N 21/4331 725/46 |
| 2016/0205428 A1* | 7/2016 | McDonough ...... H04N 21/4524 725/31 |
| 2016/0267523 A1* | 9/2016 | Biswas ............. G06Q 30/0201 |
| 2016/0328485 A1 | 11/2016 | Dodonov et al. |
| 2016/0337426 A1 | 11/2016 | Shribman et al. |
| 2016/0371750 A1 | 12/2016 | Peddinti et al. |
| 2017/0006036 A1 | 1/2017 | Bellingham |
| 2017/0032005 A1 | 2/2017 | Zheng et al. |
| 2017/0041296 A1 | 2/2017 | Ford et al. |
| 2017/0083941 A1* | 3/2017 | Biswas ............. G06Q 30/0275 |
| 2017/0103553 A1 | 4/2017 | Busayarat et al. |
| 2017/0104838 A1 | 4/2017 | Busayarat et al. |
| 2017/0104842 A1 | 4/2017 | Busayarat et al. |
| 2017/0105049 A1 | 4/2017 | Busayarat et al. |
| 2017/0177333 A1 | 6/2017 | Busayarat et al. |
| 2017/0214764 A1 | 7/2017 | Bakshi et al. |
| 2017/0323028 A1 | 11/2017 | Jonker et al. |
| 2017/0353577 A1 | 12/2017 | Lutz et al. |
| 2018/0039647 A1 | 2/2018 | Winstanley et al. |
| 2018/0060248 A1 | 3/2018 | Liu et al. |
| 2018/0131633 A1 | 5/2018 | Li |
| 2018/0183891 A1 | 6/2018 | Zhang et al. |
| 2019/0095395 A1 | 3/2019 | Piecko |

FOREIGN PATENT DOCUMENTS

| | | |
|---|---|---|
| WO | 2007/054687 A1 | 5/2007 |
| WO | 2011/102824 A2 | 8/2011 |
| WO | 2017004138 A1 | 1/2017 |

OTHER PUBLICATIONS

Non-Final Office Action received for U.S. Appl. No. 16/157,649 dated Jan. 19, 2021, 86 pages.

International Search Report and Written Opinion received for International Application Serial No. PCT/US2016/056755 dated Dec. 19, 2016, 15 pages.

Non-Final Office Action received for U.S. Appl. No. 15/285,439 dated Jul. 27, 2017, 27 pages.

Notice of Allowance received for U.S. Appl. No. 15/252,166 dated Mar. 22, 2018, 40 pages.

Final Office Action received for U.S. Appl. No. 15/285,439 dated Feb. 2, 2018, 23 pages.

El-Ansary et al., "An Overview of Structured P2P Overlay Networks," In: Handbook on Theoretical and Algorithmic Aspects of Sensor, Ad Hoc Wireless, and Peer-to-Peer Networks 1 led] Jie Wu, Auerbach Publications, 2006, 27 pages.

Non-Final Office Action received for U.S. Appl. No. 15/291,247 dated Jun. 14, 2018, 70 pages.

Non-Final Office Action received for U.S. Appl. No. 15/290,722 dated Jun. 28, 2018, 29 pages.

Office Action received for Colombian Patent Application Serial No. NC2018/0005094 dated Aug. 22, 2018, 3 pages (including English translation).

Non-Final Office Action received for U.S. Appl. No. 15/285,439 dated Jul. 25, 2018, 32 pages.

European Office Action received for EP Patent Application Serial No. 16787677.0 dated May 30, 2018, 3 pages.

Office Action received for Chinese Patent Application Serial No. 201690001472.1 dated Aug. 17, 2018, 2 pages.

Non-Final Office Action received for U.S. Appl. No. 15/291,810 dated Nov. 19, 2018, 43 pages.

Final Office Action received for U.S. Appl. No. 15/285,439 dated Jan. 30, 2019, 41 pages.

International Search Report and Written Opinion received for International Application Serial No. PCT/US2018/030717 dated Aug. 7, 2018, 16 pages.

Final Office Action received for U.S. Appl. No. 15/290,722 dated Feb. 25, 2019, 33 pages.

Communication pursuant to Article 94(3) EPC received for EP Application Serial No. 16787677.0 dated Mar. 13, 2019, 8 pages.

Non-Final Office Action received for U.S. Appl. No. 15/584,142 dated Apr. 29, 2019, 144 pages.

Non-Final Office Action received for U.S. Appl. No. 15/449,229 dated Jun. 28, 2019, 52 pages.

Notice of Allowance for U.S. Appl. No. 15/291,810 dated Apr. 22, 2019, 22 pages.

Non-Final Office Action received for U.S. Appl. No. 15/290,722 dated Sep. 9, 2019, 23 pages.

Non-Final Office Action received for U.S. Appl. No. 15/285,439 dated Jul. 25, 2019, 39 pages.

Second Office Action received for Colombian Application Serial No. NC2018/0005094 dated Jul. 4, 2019, 30 pages (with English translation).

Notice of Allowance received for U.S. Appl. No. 16/054,278 dated Dec. 18, 2019, 58 pages.

Final Office Action received for U.S. Appl. No. 15/584,142 dated Nov. 6, 2019, 155 pages.

International Search Report and Written Opinion for International Application Serial No. PCT/US2019/055851 dated Nov. 22, 2019, 13 pages.

Summons to attend oral proceedings pursuant to Rule 115(1) EPC received for EP Application Serial No. 16787677.0 dated Dec. 6, 2019, 7 pages.

Notice of Allowance received for U.S. Appl. No. 15/584,142 dated Feb. 21, 2020, 30 pages.

(56) References Cited

OTHER PUBLICATIONS

Non-Final Office Action received for U.S. Appl. No. 16/561,572 dated Sep. 23, 2020, 45 bages.
Decision to refuse a European Patent application received for European Patent Application Serial No. 16787677.0 dated Jul. 22, 2020, 26 pages.
Final Office Action received for U.S. Appl. No. 16/290,224 dated Oct. 21, 2020, 40 pages.
Non-Final Office Action received for U.S. Appl. No. 16/290,224 dated Apr. 22, 2020, 87 pages.
Non-Final Office Action received for U.S. Appl. No. 16/157,649 dated Jun. 15, 2021, 28 pages.
International Preliminary Report on Patentability received for PCT application No. PCT/US2019/055851 dated Apr. 22, 2021, 8 pages.
Non-Final Office Action received for U.S. Appl. No. 16/157,649 dated Sep. 14, 2021, 52 pages.
Non-Final Office Action received for U.S. Appl. No. 16/889,129 dated Nov. 23, 2021, 81 pages.
Non-Final Office Action received for U.S. Appl. No. 16/854,135 dated Jan. 6, 2022, 59 pages.
Non-Final Office Action received for U.S. Appl. No. 16/889,149 dated Jan. 19, 2022, 56 pages.
Final Office Action received for U.S. Appl. No. 16/157,649 dated Apr. 22, 2022, 59 pages.
Mexican Office Action for Mexican Application Serial No. MX/a/2018/004690 dated Jul. 14, 2022, 6 pages.
Notice of Allowance received for U.S. Appl. No. 16/889,149 dated Sep. 29, 2022, 41 pages.
Non-Final Office Action received for U.S. Appl. No. 16/157,649 dated Sep. 1, 2022, 64 pages.
Final Office Action received for U.S. Appl. No. 16/854,135 dated Sep. 2, 2022, 41 pages.
Office Action received for Canadian Patent Application Serial No. 3002055 dated Nov. 23, 2022, 4 pages.
Office Action received for Mexican Patent Application Serial No. MX/a/2018/004690 dated Oct. 11, 2022, 11 pages (Original Copy).
Notice of Allowance received for U.S. Appl. No. 16/157,649 dated Dec. 21, 2022, 38 pages.
EP Office Action for received for European Patent Application Serial No. 19795414.2 dated Jan. 12, 2023, 7 pages.
Non-Final Office Action received for U.S. Appl. No. 16/854,135 dated May 11, 2023, 84 pages.
Notice of Allowance received for U.S. Appl. No. 16/854,135 dated Sep. 18, 2023, 34 pages.
Office Action received for Mexico Patent Application Serial No. MX/a/2018/004690 dated Apr. 27, 2023, 22 pages (Including English Translation).
Office Action received for Mexico Patent Application Serial No. MX/a/2018/004690 dated Sep. 19, 2023, 26 pages (Including English Translation).
Office Action received for Canadian Patent Application Serial No. 3002055 dated Dec. 4, 2023, 3 pages.

* cited by examiner

RESOURCE RESPONSE EXPANSION

CROSS-REFERENCE TO RELATED APPLICATIONS

This application is a continuation of co-pending U.S. patent application Ser. No. 15/285,439, filed Oct. 4, 2016, entitled "RESOURCE RESPONSE EXPANSION," which claims priority to U.S. provisional patent application Ser. No. 62/240,888, filed Oct. 13, 2015. The entireties of the aforementioned applications are hereby incorporated by reference herein.

BACKGROUND

In many scenarios, client users interact with information downloaded from a data service. Some of the downloaded information may be represented via a user interface, such as menus of buttons, tiles, icons and/or text by which a client user may make a desired selection. For example, when selecting streaming video content such as a movie or television show to view, a client user may first interact with a scrollable menu containing tiles, icons, text and/or buttons that represent the video content that is currently available for viewing. The client user interacts with such menu items to make a selection.

With a data service that offers relatively large amounts of such data, client devices only download a subset of the data at a time. In general, this is because resources including network bandwidth, client device storage, client device processing capability and so on are limited. At the same time, client users do not want to experience too long of a delay each time more data needs to be downloaded.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards receiving a client request for an identified data item at a data service. The identified data item is returned from the data service to the client (device) in response to the client request. The data service also determines whether to return an expanded data item set (e.g., one or more other, non-requested data items) based upon the identified data item, and if so, the data service returns the expanded data item set from the data service to the client device.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
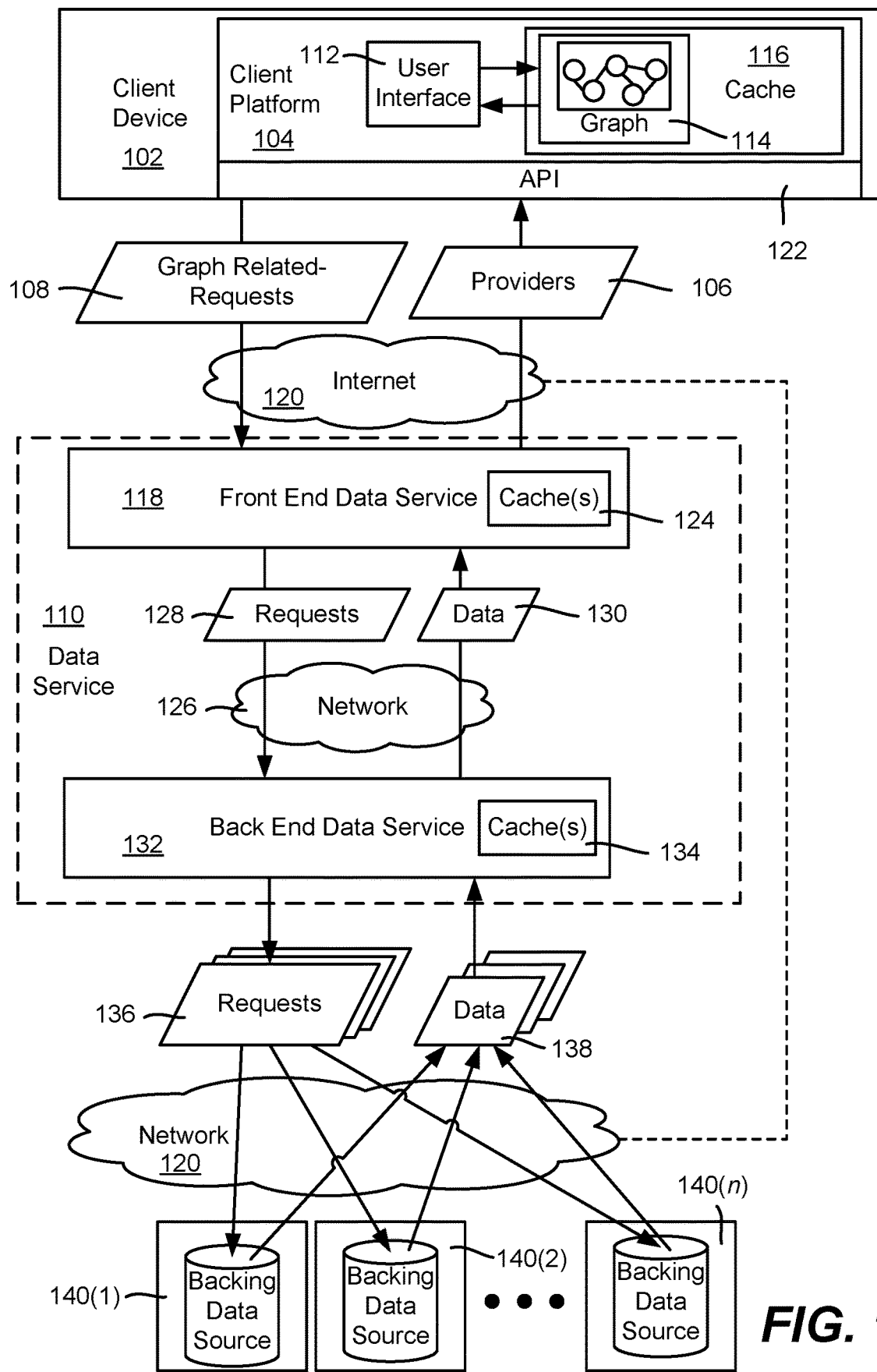
FIG. 1 is an example block diagram representation of a client device communicating with a data service to obtain data items, including expanded data items, according to one or more example implementations.

Various aspects of the technology described herein are generally directed towards having a data service expand the data returned to a client requestor beyond the data that was specifically requested, in order to reduce or eliminate likely subsequent requests for more data. The expansion of the returned data may be based upon a client request for a data item, using rules or the like that predict an anticipated need for one or more related data items by the client.

Note that client devices cache such returned data, including the expanded data, whereby if subsequently needed, the expanded data maintained in a client cache may be used to respond to a request, instead of obtaining the data via communication with the data service. As a result, although such expanding of requests/responses consumes some additional resources, the technology described herein can significantly reduce the number of data service requests, and thereby significantly conserve resources overall. Moreover, the client user experience is improved if such expanded information gets used, as once cached at the client device, needed data obtained from the client cache is available for processing almost instantaneously relative to having to obtain that data via the data service.

By way of example, consider a popular television show. A client user may select that show for viewing via a sequence of menu interactions, such as to choose a "TV Shows" menu from a "Root" menu, then a "Series" menu from the "TV Shows" menu, then a "Popular Series" menu from the "Series" menu, then the desired series name from the "Popular Series" menu. From there, the user may be offered a "Seasons" menu for that show, and once a season is selected, then be offered to select among particular episodes within that season. Each menu selection to a new menu typically results in a request sent to the data service followed by a response download to each client device, which consumes resources and takes time. Indeed, each delay at the client may be noticeable, e.g., on the order of seconds, as the request is received by the data service, the data retrieved and processed into an appropriate response, with the response then downloaded to the client before being processed by the client into visible output for further user interaction.

Aspects of the technology described herein include predicting (e.g., through manual and/or machine-learned observation/training, e.g., of client calling patterns) and/or otherwise estimating what data client users will request next, so as to download that data before actually being requested. To this end, a data service response to a request for a data item may comprise an expanded response, e.g., comprising the requested data and the expanded data for the likely next request (or multiple requests). The expanded data basically pre-populates the client cache with data related to other data the client is already using, and thereby can often avoid one or more future client requests to the data service.

In the above example, consider that a significant number of users tend to select the "Popular Series" menu from the "Series" menu. The data that are needed for rendering the "Popular Series" menu selections correspond to information for the buttons/tiles/icons/text representing each available series currently deemed by the service to be popular (or at least a subset thereof if not all selections can be shown at once). Thus, when the user selects "Popular Series" from the "Series" menu, this information is needed, and a request is thus made by the client, (e.g., by a "Series" menu user interface object or component coupled thereto).

As described herein, rather than wait for the actual "Popular Series" data items request, the data service may be configured to recognize that a related, earlier request (e.g., the request for the "Series" menu made from the "TV Shows" menu) is to be given an expanded response that also includes the information needed for rendering the "Popular Series" menu items, in the event that the "Popular Series" menu gets selected. This may be based upon observed statistics or the like, such as sixty percent of client users who select the "Series" menu from the "TV Shows" menu go on to select the "Popular Series" menu. Although the "Series" response is expanded, and (if the statistics generally hold) the expanded data is not used by approximately forty percent of clients, the total number of separate internet requests for the "Popular Series" requests is significantly reduced, which saves overall network resources and overall load on the data service.

Obtaining an expanded response may be accomplished by expanding the initial data item request, e.g., when received at the data service. For example, a client request for a data item A may be expanded at the data service into a request for data items A, B and C. When the client receives the expanded response, the client only need be configured to cache the response's data items A, B and C, (and use requested data item A as desired), which is a straightforward task for a client software platform to implement. Any further requests for data items A, B and/or C thereafter may be responded to with data from the client cache (until item expiration).

It should be understood that any of the examples herein are non-limiting. For instance, some of the examples refer to data related to client selection of video content (including audio) from a streaming service that delivers movies, television shows, documentaries and the like. However, the technology described herein is independent of any particular type of data, and is also independent of any particular user interface that presents the data. Further, one or more example implementations are described in which the client data items are arranged as a graph of linked nodes (referred to as providers in the client), with requests for expanded data items typically made based upon relationships in the graph; however a graph is only one example client data arrangement, and expanded data may be returned for client requests regardless of how the client data is maintained and/or related (if indeed related at all). Thus, any of the embodiments, aspects, concepts, structures, functionalities or examples described herein are non-limiting, and the technology may be used in various ways that provide benefits and advantages in data request/response communication and data processing in general.

In general, the data for a user interface (UI) may be structured in various ways that maintain relationships between the UI elements, such as a hierarchy or graph of data items. In one or more implementations exemplified herein for purposes of explanation, the data is maintained in graph nodes (providers) based upon a client graph. Thus, for example, a menu object may request a set of tile objects to render within the display of the menu; the menu object may correspond to one provider in the graph, and the tiles may correspond to other, child providers; e.g., each tile corresponds to a provider that holds the data for that tile. Edges relate (at least) the menu provider to the tile providers.

In general, a graph of providers is built by each client of the data service, in which a provider represents a part of the overall underlying data that is available via a data service; (as used herein a "graph" is formed by the relationships between providers or provider data structures, regardless of whether visibly represented as nodes and edges). The set of providers for a given client includes a subset of the available data service's data that are currently relevant to that client, e.g., those which the client user interface displays. The edges between nodes model the relationships between the various providers.

To build the client graph, in addition to the data properties/attributes maintained in a provider, a provider's data also may include edge references to other providers, as well as possibly more specific relationship information, e.g., indicative of a child or parent relationship to another provider. The client platform software follows these references to obtain more providers as needed. For example, if a provider A, such as representing a menu, references two child providers B and C, then when provider A is to be rendered as a user interface menu object, the data is obtained for providers B and C so that they can be rendered as part of the A menu, and so on. If a client interacts to select item B, e.g., a sub-menu object of menu A, then the provider data for sub-menu B including B's referenced providers are requested and obtained so that menu object B can be rendered.

Once obtained, providers may be cached at the client so that they may be quickly accessed from the cache rather that obtained via another (e.g., internet) request to the data service. As described herein, one or more providers may be returned from the data service in an expanded response, in anticipation of their likely being needed rather than waiting for an actual need, with those expanded providers cached by the client.

In general, providers have an identifier (ID) that is unique to the data service, and indeed may be globally unique, such as a Uniform Resource Name (URN); (e.g., urn:hbo:menu:root). Providers are typed, (note that in one scheme, the type of provider also may be determined from its URN) and each provider implements a model with a model interface that defines the schema/shape of the provider's data. For example, with respect to video content, there may be a provider of type "feature" that represents some available streaming video content and includes a title, a URL to an image, a rating (if known), and so forth. As another example, a provider of type "user" may represent a client user, and may have per-user data such as a username, parental controls (such as maximum rating allowed), a "watch-list" of user-specified (and/or for example machine learned) shows of particular interest or the like, and so forth. Via the user provider, different per-user portions of graph data may be associated with different client users.

Thus, based upon user interaction as well as automated processes, using the graph providers' relationships, a client software platform makes requests for one or more providers to obtain their data as needed. The client requests may be to a request handling portion of a data service, e.g., a client interfacing front-end data service coupled to the client via the internet. The front-end data service interprets each request and responds with the requested data, which in one or more implementations may be obtained from a front-end cache, or via a back-end data service, including from backing data sources. In this way the client software builds relevant portion(s) of the graph as needed, which in general is highly efficient with respect to resource usage and obtaining rapid responses. Note that providers may be cached at the client as described herein, and thus each time data is needed the client platform may first attempt to use cached data without making a request to the request handling portion of the data service. Expansion as described herein pre-populates the cache with data items (e.g., providers) that related to requested data items.

FIG. 1 is a block diagram representing example components that may be used to handle client requests for data items, exemplified as providers (graph nodes from a data service), based upon a client graph. As exemplified in FIG. 1, a client device 102 runs client platform software 104 that receives providers 106, including via graph-related requests 108, from a data service 110. Note that the client device 102 initially may receive one or more starting providers corresponding to typed nodes automatically, e.g., when the client user of the client device 102 authenticates with the data service 110. For example, when the user logs in on the client device 102, the client device 102 may receive a user provider, a root provider and so forth that the client platform software 104 expects upon successful authentication. In this way, the client platform 104 may present initial user interface elements by rendering a root menu or the like based upon the root provider, such as a home/root menu, with buttons, icons, tiles and so forth by which a user can navigate to other locations. Note that because in one or more implementations the root provider is the starting point for an interactive user interface 112, in addition to the root provider one or more providers referenced by the root provider may be automatically communicated to the client in advance. Note however that this is only one possible optimization, and alternatively the client device may be configured to make requests for any needed data, including the root provider at start up, as well as providers that are children of the root provider, and so on.

In one or more implementations, the client software program's UI elements or the like may make requests for data items to the client platform (e.g., at a data service level) without needing to know about providers or how the underlying data is maintained, organized, retrieved and so forth. For example, a tile object that represents a television show may in a straightforward manner send a request to the client platform software for a title corresponding to a title ID (which in one or more implementations is also the provider ID), and gets the title back. As will be understood, beneath the UI level, the client platform software obtains the title from a (feature type) provider corresponding to that ID; the provider data may be obtained from a client cache, but if not cached, by requesting the provider from a data service, as described herein.

As set forth above, each provider may reference one or more other providers, which forms a graph 114 (e.g., generally maintained in a client cache 116 or other suitable data storage). The client graph 114 is built by obtaining the data for these other providers as needed, such as when providers are rendered as visible representations of objects on the interactive user interface 112. Example visible representations of provider data may include menus, tiles, icons, buttons, text and so forth.

In general, the client graph 114 comprises a client-relevant subset of the overall data available from the data service 110; (the available data at the data service can be considered an overall virtual graph). Because in the client platform 104 the underlying data forms the client graph 114, at least part of which are typically represented as elements on the user interface 112, a user can interact to receive data for any relationship that the data service 110 (e.g., of the streaming video service) has decided to make available, including relationships between very different kinds of data, and/or those that to some users may seem unrelated. Over time the data service 110 can add, remove or change such references as desired, e.g., to link in new relationships based upon user feedback and/or as new providers and/or provider types become available.

To obtain the providers 106, the client platform 104 interfaces with the data service 110, e.g., via a client interfacing front-end data service 118, over a network such as the internet 120. An application programming interface (API) 122 may be present that may be customized for devices and/or platform software versions to allow various types of client devices and/or various software platform versions to communicate with the front-end data service 118 via a protocol that both entities understand.

The front-end data service 118 may comprise a number of load-balanced physical and/or virtual servers (not separately shown) that return providers 106, in a manner that is expected by the client platform software 104. The returned providers 106 may include the requested provider(s) and one or more expanded providers that were not specifically requested, as described herein. Some of the requests for a provider may correspond to multiple sub-requests that the client platform software 104 expects in a single provider; for example, a request for a tile provider that represents a feature (movie) may correspond to sub-requests for a title (in text), an image reference such as a URL, a rating, a plot summary and so on. A request for a user's "watch list" may correspond to sub-requests for multiple tiles. The data service 110 understands based upon each provider's type how to obtain and assemble data sub-parts as needed, from possibly various sources, into a single provider to respond to a client request for a provider.

The corresponding provider may be contained in one or more front-end caches 124, which allows like requests from multiple clients to be efficiently satisfied. For example, each load-balanced server may have an in-memory cache that contains frequently or recently requested data, and/or there may be one or more front-end caches shared by the front-end servers. The data is typically cached as a full provider (e.g., a tile corresponding to data from multiple sub-requests), but it is feasible to cache at least some data in sub-parts that are aggregated to provide a full provider. Data items that are expanded data items with respect to a requested data item may be cached.

Some or all of the requested data may not be cached (or may be cached but expired) in the front-end cache(s) 124. For such needed data, in one or more implementations, the front-end data service 118 is coupled (e.g., via a network 126, which may comprise an intranet and/or the internet) to make requests 128 for data 130 to a back-end data service 132. The requests 128 may include requests for expanded data as described herein, with the expanded data returned among the data 130.

The back-end data service 132 similarly may comprise a number of load-balanced physical and/or virtual servers (not separately shown) that return the requested data, in a manner that is expected by the front-end data service 118. The requested data may be contained in one or more back-end data caches 134. For example, each load-balanced back-end server may have an in-memory cache that contains the requested data, and/or there may be one or more back-end caches shared by the back-end servers.

For requests that reach the back-end data service 132 but cannot be satisfied from any back-end cache 134, the back-end data service 132 is further coupled (e.g., via an intranet and/or the internet 120) to send requests 136 for data 138 to one or more various backing data sources 140(1)-140(n). Non-limiting examples of such data sources 140(1)-140(n) may include key-value stores, relational databases, file servers, and so on that may maintain the data in virtually any suitable format. A client request for provider data may correspond to multiple sub-requests, and these may be to backing data sources; the data service 110 is configured to make requests for data in appropriate formats as needed to the different backing data sources 140(1)-140(n). Moreover, one data store's data may override another data store's data; e.g., the data for a television show may include a generic image URL obtained from one data store, however an "editorial"-like data store may override the generic image with a different image, such as for some uncharacteristic episode. Note that in one or more implementations, non-cache data sources 140(1)-140(n) may use a wrapper that implements a common cache interface, whereby each remote data source 140(1)-140(n) may be treated like another cache from the perspective of the back-end data service 132.

Figure 2:
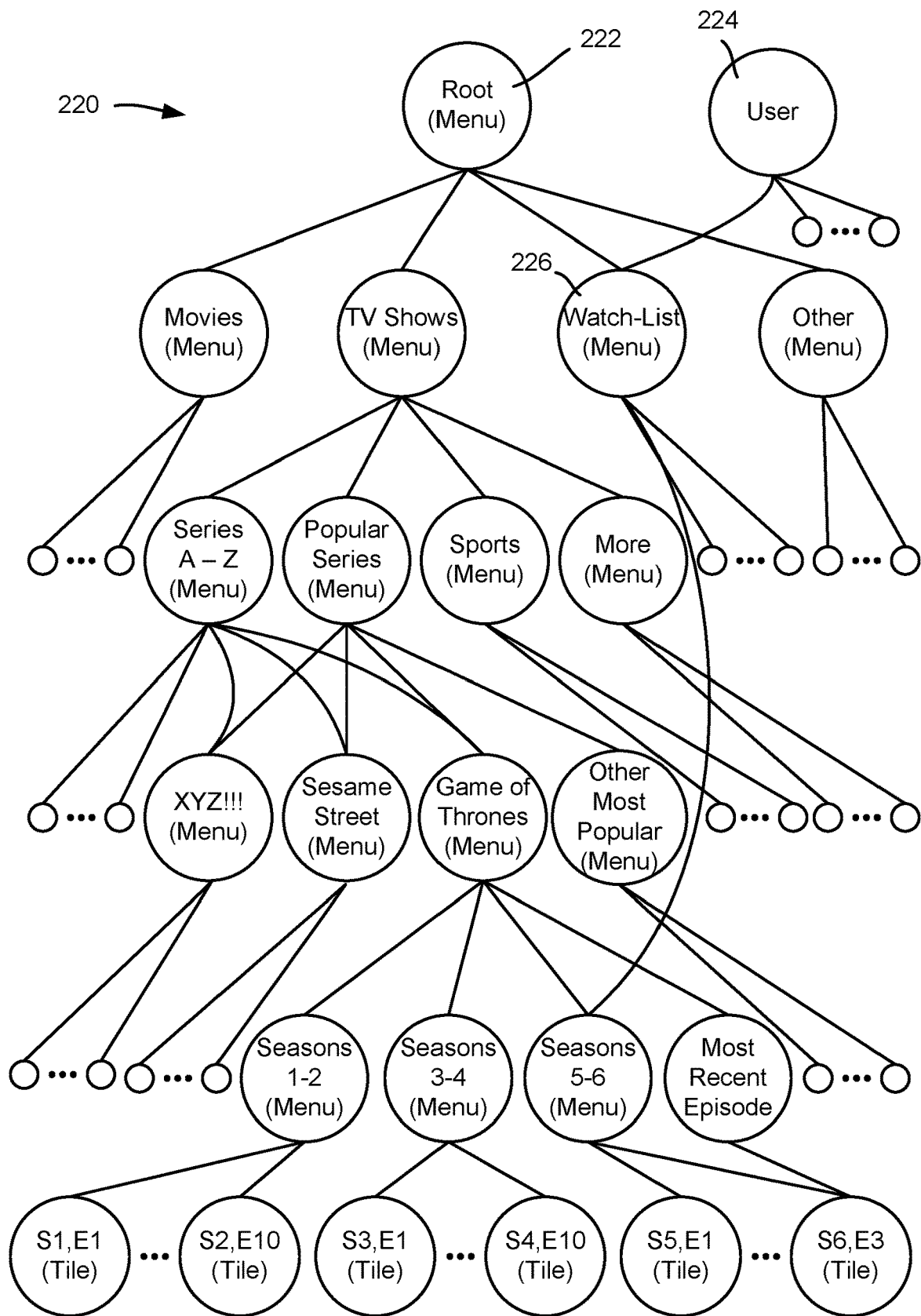
FIG. 2 is a representation of a client graph built from returned providers, which may include providers returned from an expanded response, according to one or more example implementations.

FIG. 2 shows an example graph representation 220 comprising providers (nodes) including a root menu provider 222 and a user provider 224, along with various child providers. As can be seen, in one or more implementations the providers may include menu provider nodes and feature provider nodes, including features corresponding to episodes of a series. In this example graph representation 220, the root menu provider 222 and the user provider 224 both link to the specific user's watch-list query provider 226. Thus, when a menu object corresponding to the root menu provider is visibly rendered for interaction, the menu object presents a tile or the like by which the client user may navigate to a sub-menu or the like containing that user's specific data of interest, e.g., including the user's favorite series and season menu.

Figure 3:
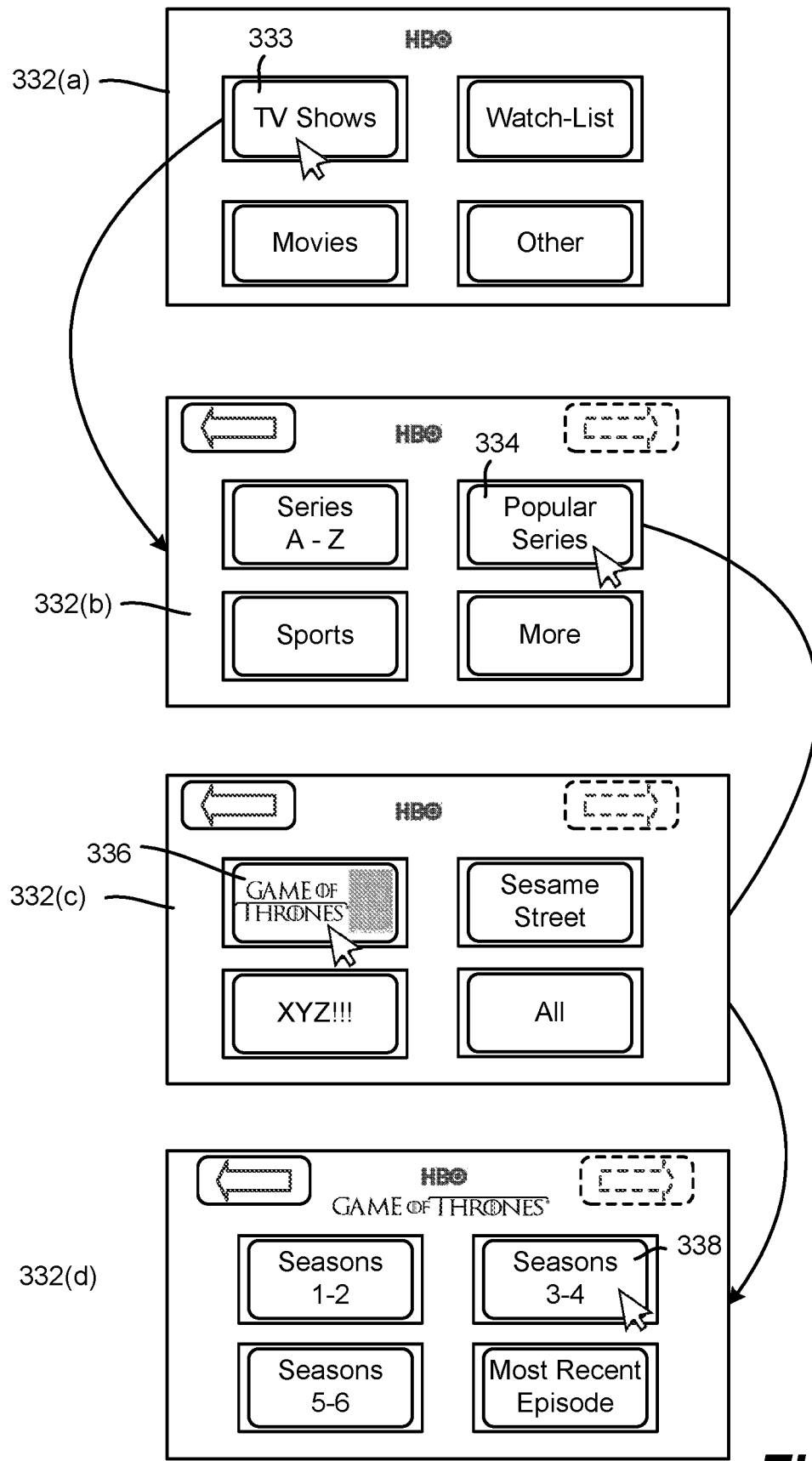
FIG. 3 is a representation of example user interfaces based upon a graph of providers such as exemplified in FIG. 2, with which a client user interacts, according to one or more example implementations.

FIG. 3 shows a hypothetical user interface of various menus objects 332(a)-332(d) that for example may be based upon some of the data providers that are part of the example graph representation 220 of FIG. 2. As can be seen, the root menu 332(a) (e.g., corresponding to the root menu provider 222 of FIG. 2) provides a number of interactive buttons, which may be interactive tiles (possibly including information beyond text) that link to menus or other information. In this example, from the root menu object 332(a), which (as obtained via the data service) offers various selections, the user interacts to select "TV Shows" 333, which navigates to a TV shows-related menu 332(b) offering tiles related to available (e.g., recorded and/or live) television shows. From there, the user selects the "Popular Series" tile 334, which navigates to a popular series menu 332(c) that offers selection tiles related to popular television series.

One of those selection tiles 336, when selected, navigates to a "Game of Thrones" series menu 332(d) showing buttons/tiles to available seasons including the button/tile 338 for seasons 3 and 4 and a most recent episode tile. Thus, in general, as a user navigates, more data is needed, and is thus initially retrieved as needed from the data service and cached (until expiration) at the client in case the same data is needed again.

Described herein is expanding a request for data so as to download additional, expanded data that a client caches in advance of its actual need on the client device. As one straightforward example, when the user selects TV shows via the tile 333, instead of requesting only the providers associated with the TV shows menu (for rendering buttons or tiles representing "Series A-Z" "Popular Series" "Sports" and "More"), the request for TV shows may be expanded beyond a request for "Series A-Z" "Popular Series" "Sports" and "More" providers. For example, if most users tend to select "Popular Series" as the next menu to view, then (at least some of) the providers for rendering that next likely "Popular Series" menu (a set of individual "Series" providers for popular shows) may be returned by the data service in anticipation of their actual need.

In one or more implementations, requests are expanded at the data service side. This allows rules to be determined for a large number users, e.g., based upon statistics that reduce overall resource consumption. Note that requests are not expanded at the client device, although it is feasible to do so (instead of or in addition to server-side expansion).

Figure 4:
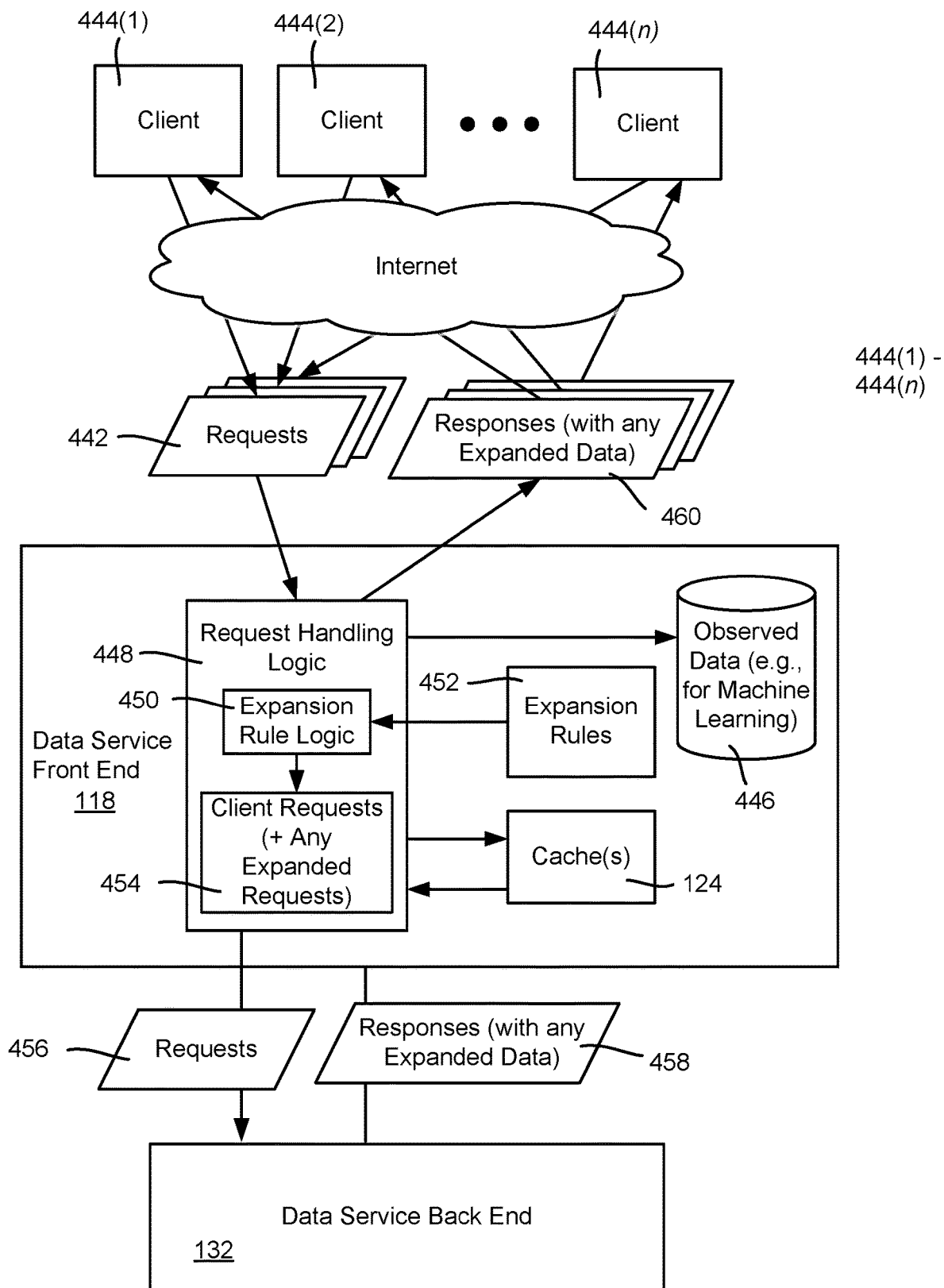
FIG. 4 is an example block diagram representation of a data service's expansion of client requests to obtain expanded provider data, according to one or more example implementations.

FIG. 4 shows an example of expansion of data request sets 442 from clients 444(1)-444(n) at a data service, e.g., the front-end portion 118. Note that each client may send a request set that requests a single provider, or a batch request that identifies multiple providers. For each requested provider, the client's request set may be expanded on a per-provider basis, per-type of provider basis, and so on as described herein. Received requests can be logged as observed data 446, e.g., to machine learn what each client requests next to build up expansion rules based upon client behaviors.

In general, request handling logic 448 receives each request set from each client and responds to the request set. The request handling logic 448 is coupled to expansion rule logic 450, (including whether the expansion rule logic 450 is incorporated into the request handling logic 448 as depicted in FIG. 4 or is a separate component), which accesses expansion rules 452 to (possibly) expand the request set for that client into what may be an expanded request set 454. A rule may be selected based upon the provider ID or provider type, in conjunction with the requesting client device type and/or software version, as further described herein with reference to FIG. 5. Note that an expansion rule may specify to not expand a request, whereby the client request set is not expanded; (it is also feasible to have the absence of an expansion rule indicate that the client request set is not to be expanded).

Rules may be based upon previously observed behaviors, e.g., from prior data logs, which may be adapted to any criteria, such as time of day, day of week, and so on to use different sets of expansion rules, or include criteria in the rules themselves. Additional information, if associated with or determinable from a request, may be used in expanding that request. For example, consider that users under twenty-five years old have a statistically high tendency to request item R right after requesting data item Q. Thus, if a client user that sends a request falls into that age group profile, (based upon information determinable from the request), a rule set that expands a [Q] request set into a [Q, R] request set may be selected for that user and other users matching that age profile.

As described above, some (or all) of the requested provider data in the request set 442 may be cached at the data service's front-end cache or caches 124. Those providers that are not cached (or if cached are expired) are retrieved from the data service back end 132, via requests 456 and responses 458 as needed; (note that instead of provider data, an appropriate response to any request may be an error). Response sets 460, which may include expanded data, are returned to each client as appropriate for their respective request or requests; (note that the response set returned to a given client may be streamed in multiple partial result responses rather than in a single response, however for purposes of simplicity a response set may be considered to satisfy a client request, as well as possibly include expanded data).

An expanded response set may be built in a way that eliminates duplicates and/or may be filtered before returning to the client to eliminate duplicates. For example, if a client's batch request for providers A and B is received, and both provider A and provider B have an expansion rule that requests provider C, then only one instance of provider C may be returned in the response set. An alternative is to have a client detect and ignore duplicates, or overwrite one cached entry with identical data. Further, if an expanded request results in an error being returned by the back-end data service, no error need be returned to the client for something the client did not actually request (although it is feasible for the client to simply ignore an error for something not actually requested).

In one or more implementations, once a response set to a client is sent, the data service is stateless with respect to maintaining client information. However, in alternative implementations it is feasible to maintain some client state so as to not return expanded data that was already (e.g., recently) returned. For example, if a client requests item A from the data service and items A and C (expanded) are returned, then a subsequent request for item B that otherwise is also expanded to return item C need not also return item C, (at least for some period of time in which the initially returned item C has not expired). Maintaining such state for clients may be useful in situations in which scalability is not an issue, e.g., where only a relatively small number of clients make requests.

Another possible use of client state data is to detect certain client request patterns, which also may have been previously observed, and use those patterns for expansion. For example, clients who request menu X, and then request menu Y, tend to next request menu Z, but not if they request menu Y in some other way; so a rule may specify to expand Y menu requests into Y, Z menu requests if past state information indicates the Y menu request followed an X menu request; however do not expand client Y menu requests that do not follow X menu requests or the like. Note that instead of maintaining state data at the data service, clients can be configured to send such state information with their request, e.g., send past information from which patterns may be detected.

As can be seen, the response to a request for a provider may be expanded with additional provider data based upon expansion rules. The rules may be developed by observing behavior over a number of client requestors, e.g., have machine learning learn usage trends, including what clients tend to request next, and so on. As described herein these rules may be as straightforward or complex as desired by the data service; e.g., "if request provider A, then also return provider B," or "if request provider A, and it is after 9 pm on a Sunday, then also return providers B, C, E, X and Q else return providers B and C." A rule may be generally less static and instead to an extent dependent on external information, e.g., for provider G, select (from a specified storage location) the providers for what are currently the four most requested "Action" movies.

As described herein, expansion rules may be tailored to different client devices and/or software versions running on those devices, (as well as possibly other criteria). For example, a type of client device such as a modern gaming console or personal computer may receive more expanded data than a different device (such as an older smartphone or internet television device type) that is known to not have much memory.

To select among different rules for different clients and/or requested data items (e.g., providers/provider types), in one or more implementations a hierarchical system is used. In one or more implementations, the hierarchical system leverages a file system hierarchy of folders and files. For example, for a menu provider of type "series" for client platform software versions on some devices, there can be various paths in the file system hierarchy to expansion rule files such as:

"...\resource\expansionRules\v3\deviceA\series.rules"
"...\resource\expansionRules\v2\deviceA\series.rules"
"...\resource\expansionRules\v2\deviceC\series.rules" (and so on).

Figure 5:
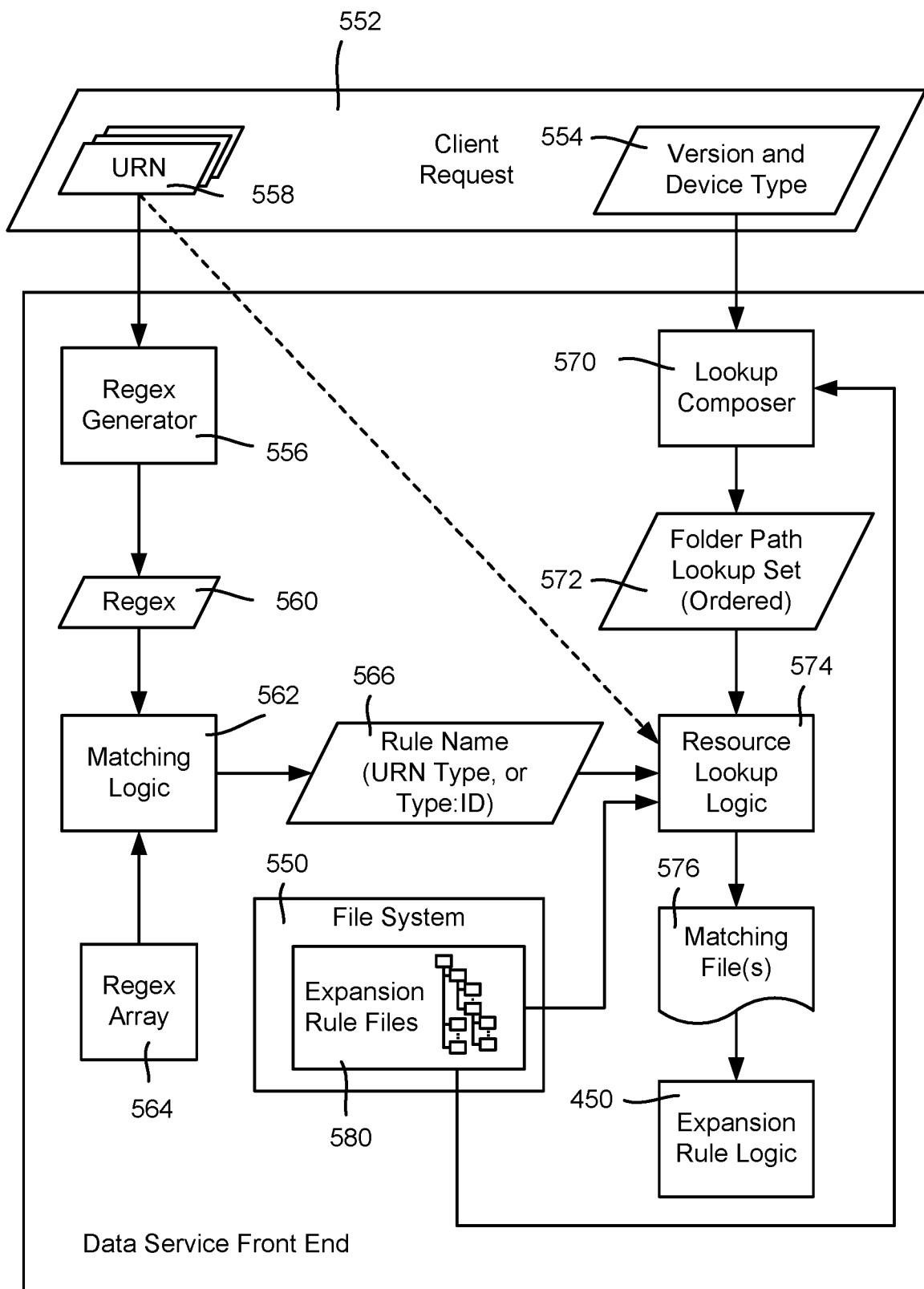
FIG. 5 is an example block diagram representing how a data item identifier and client-specific information may be used to select an expansion rule for the requested data item (or data item type) based upon the client device/software information, according to one or more example implementations.

FIG. 5 shows an example of finding an applicable expansion rule file for a client device and software version via a hierarchical file system 550, in which providers are identified and requested via a uniform resource name, or URN that is unique (at least within the data service). When a client request 552 is received, along with the provider URN ID(s) requested, the client device type and/or software version 554 are also known to the data service front end, e.g., as part of an authorization/access token. Alternatively, instead of an authorization token, additional data sent with the request data can provide the client device type and/or software version.

As exemplified in FIG. 5, a regular expression (Regex) generator 556 processes each provider URN (e.g., 558) into a regular expression 560. Matching logic accesses 562 a Regex array 564 against the regular expression 560 to determine a rule name 566 (e.g., a string) corresponding to the type or type:ID that matches the regular expression derived from the provider URN. The rule name 566, e.g., represented by the text of the string, is thus determined based upon the provider type or the provider type:ID.

For example, for a series type URN, (e.g., "urn:hbo:series:gameofthrones") the rule match may return the name "series" based upon the type, (the rule name string "series" was matched by the Regex generator 554), whereby the expansion rule file is based only on the type, such as "series.rules" or the like. Overrides/more particular files relative to the type may be made by having the regular expression array 564 have a matching type and ID. For example, a URN such as "urn:hbo:navigation:FAQ" may have an entry in the regular expression array 564 such that the Regex generator 554 matches the type (navigation) and ID (FAQ), with a string such as "navigation.FAQ" such that the resource lookup logic 574 looks for an expansion rule file named "navigation.FAQ.rules" or the like.

It should be noted that in a more simplified system, e.g., in which there only relatively a few data items rather than thousands of providers of different types, the data item IDs may be more directly used, (e.g., as represented in FIG. 5 by the dashed arrow). For example, if only dozens of data items had to be dealt with for expansion, then each data item ID (or unique portion thereof) may be used as is for the "rule name" for resource lookup, e.g., without first processing into a regular expression for matching and so on as described herein.

In one or more implementations, for matching the matched rule name 566 (e.g., the string derived and matched from the URN) to client-specific information (e.g., the client-specific client device type and/or software version 554), which in this example has an associated expansion rule file, the file system hierarchy is leveraged. More particularly, based upon the version and device type data 554, a lookup composer 570 builds (or retrieves from a cache if previously built) a set of file system folder paths 572 for this version and device type, in which the paths are ordered based upon most specific to least specific.

For example, a folder path lookup set 572 may be something such as [" . . . \resource\expansion Rules\v3\deviceA\series.rules" and " . . . \resource\expansion Rules\v3\default\series.rules"]. Using the folder paths, ordered from most specific to least specific, a file access attempt is made, e.g., for a "series.rules" file. If a "file not found" is returned for the access attempt, e.g., there is not (" . . . v3\deviceA\series.rules" file), the next path is used, and so on. Note that the file system folders and files may be maintained in relatively fast memory, e.g., RAM, whereby retrieval of the file is extremely rapid.

In this example, within the file system, an expansion rule file may exist that corresponds to the type or type:ID for the provider's URN as exemplified above; if a specific expansion rule file does not exist, e.g., for V3 of a deviceA, a default expansion rule file is used. In one or more implementations, a default expansion rule file is always present in the hierarchy (otherwise this is considered an error in the system). When expansion is not desired for a data item. It is feasible for an expansion rule file to exist that specifies no expansion. It is also feasible in alternative implementations for no rule file to exist when expansion is not desired; (further, as can be readily appreciated, if for example an entire type of provider is not to be expanded, then this type may be detected earlier, whereby for efficiency the matching process and/or file lookup may be bypassed for such an exceptional type).

Resource lookup logic 574 thus uses the path set 572, along with the rule name (URN type or type and ID) to find the most specific expansion rule file 576 that applies from among the expansion rule files 580. Note that in one or more implementations, only a single such expansion rule file is found, which makes management straightforward, e.g., simply add, replace or remove an expansion rule file from the set of file system files as a whole, as appropriate. However it is feasible for alternative implementations to return multiple expansion rule files that are combined in some way, e.g., to use rules from each. Such a system allows delta overrides to be used, e.g., use version 3 expansion rules after overriding with expansion rule changes for version 3.1, and so on.

Once the expansion rule file is found, the expansion rule logic 450 may then use the rule file information, if any, to expand the request. As can be seen, for any given data item such as a provider or provider type, an expansion rule file for that data item (or data item type) may be used that is tailored to a specific client software version and/or device type.

Figure 6:
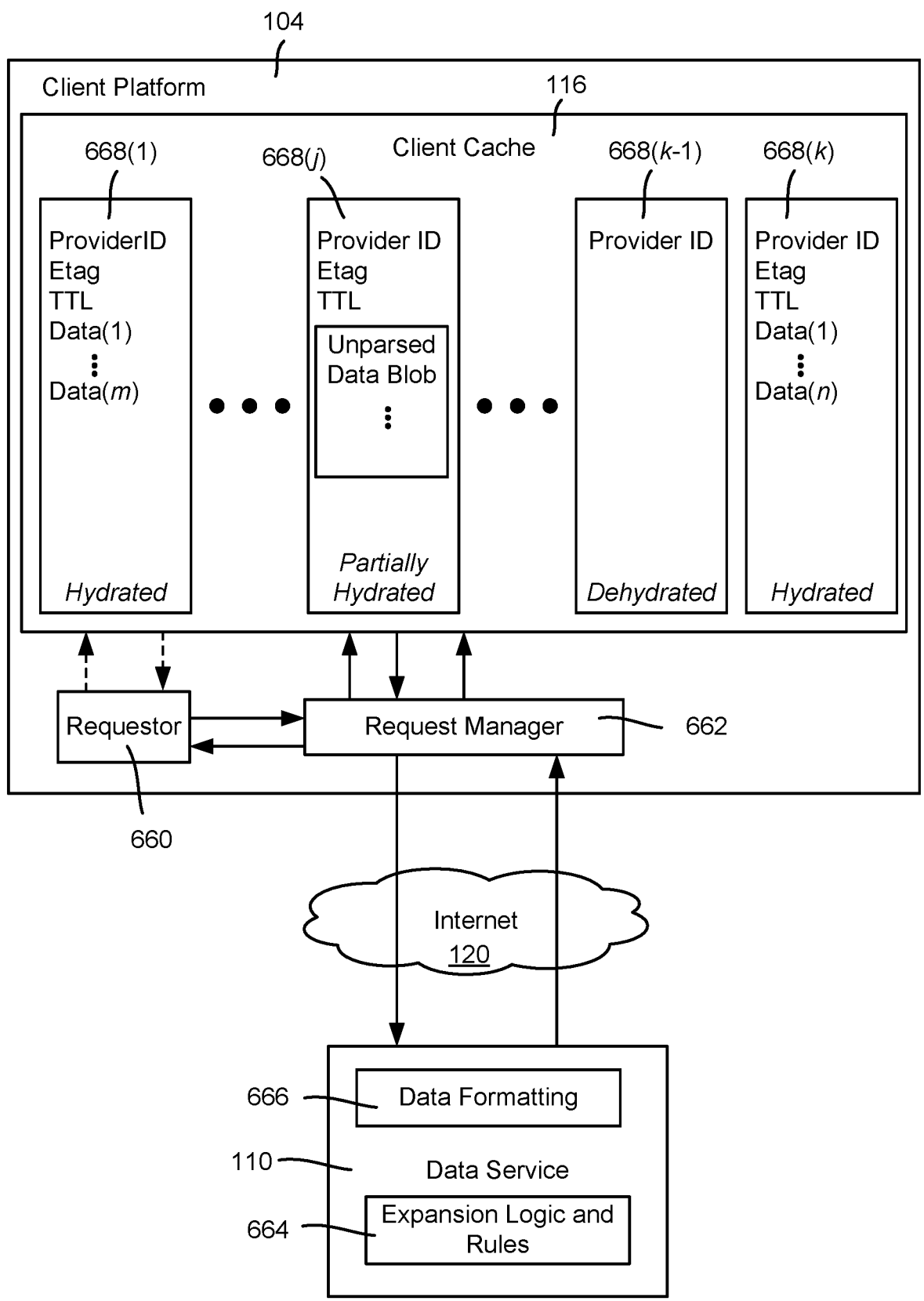
FIG. 6 is an example of a client cache containing information corresponding to providers and data in various states, including a partially hydrated state for expanded providers, according to one or more example implementations.

As described herein, data items (e.g., providers) may be cached at the client platform 104 (FIG. 1), allowing expanded sets of one or more data items to be retrieved from the data service 110 in anticipation of their need. FIG. 6 shows an example of some data that may be maintained in the client cache 116 to represent providers in the graph. In general, the client platform 104 includes or is coupled to the cache 116.

In one alternative implementation, a requestor 660 (such as a UI object or component coupled thereto that needs provider data) passes its request to a request manager 662. The request manager 662 first checks the client cache 116 to determine whether the needed data is in the client cache 116. If so, and the data is not considered expired, the request manager 662 uses the data from the client cache 116 to respond to the request. In alternative implementations the requestor 660 itself may check the client cache 116 (represented by the dashed arrows between the requestor 660 and the client cache 116), and only forward a request for the data to the request manager 662 if the data is not found or is considered expired in the client cache 116.

For requests not satisfied via the client cache 116, the request manager 662 communicates (e.g., via the internet 114) with the data service 110 (the client facing front-end) to obtain the requested data. As described herein, the exemplified data service 110 may include expansion logic and rules 664, which, as applicable to a given request, may expand the request into a larger query in anticipation of more data being desired than is currently being requested. In general, if expansion applies, at least one more data item (e.g., provider) than requested is returned. The data service 110 also may include a data formatting mechanism 666 that formats and shapes the response data into what the client device and software platform version expect with respect to the response data.

In the example implementation of FIG. 6, each exemplified cache entry 668(1)-668(k) includes a provider identifier (ID) that serves as a service-unique key to any associated value (data) in the store maintained for that provider in the cache. For example, the provider ID cache key may be the provider URN hashed by a hash function to determine the location, e.g., in a hash-mapped cache.

In general, in one or more implementations, on the client device a provider is an object that is instantiated with its data when needed in the client graph. However a provider may be "instantiated" without having its data yet retrieved, or a provider may have its data retrieved but not yet parsed into object form. Thus, in one or more implementations, a provider may be maintained in one of multiple (e.g., three) different states.

One possible state, referred to as a dehydrated state, is shown for entry 668(k-1), in which the provider is known to exist but the data for that provider has not yet been retrieved. For example, while a response for a requested provider is pending, such a reference may be used to set up an entry in the client cache 116. Note that for a dehydrated entry such as the entry 668(n-1), an expiration value (e.g., timestamp or time-to-live/TTL value) may be present by default or the entry otherwise flagged in some way so as to not evict the provider ID from the cache 116 too quickly.

Another state, referred to as a hydrated state, is shown for entries 668(1) and 668(k). In the hydrated state, the provider data is present and ready for use in the graph, that is, the provider data has been obtained and parsed into a useable object format in the client cache 116. When a client request for a provider's data is processed, the client cache 116 is accessed and the corresponding provider data returned if the provider is cached in the hydrated state (and not considered expired).

Yet another state is a partially hydrated state, shown for client cache entry 668(j). More particularly, in an implementation in which a provider may be received in anticipation of its need, e.g., via the expansion logic and rules 664, the data may be returned as an unparsed data blob (e.g., a JSON object). In such an implementation that uses a partially hydrated state, only if and when the data is actually needed for a client request may a partially hydrated cache entry be parsed (e.g., by provider code) into a hydrated cache entry in object form for use by the requestor 660. This optimization is not necessary, as expanded data may always be parsed into object form in alternative implementations so that the hydrated object form is always cached, but when used, avoids the computational expense of parsing a provider data blob into the object format unless and until the provider's hydrated object data is needed.

Turning to another aspect, it is feasible to expand upon expanded data requests. For example, consider that a request for some data item (or data item type) X is expanded into a request for data items X and Y. In turn, the request for data item Y may be expanded into a secondary expanded request for data item Z, (to request [X, Y and Z] when only X was actually requested) and so on. As can be readily appreciated, expansion can expand a request to a large number of providers, and thus some practical limit(s) may be applied.

One such limit is to have a rule set a maximum expansion number for a requested provider, e.g., the total number for that data item cannot exceed ten. A default total maximum may be set if not specified; further, the total maximum or default can be the same for each data item or data item type, per device and software version, or may vary amongst data item or data item types for device and software version. Another limit is to have a rule set a maximum depth level for secondary expansion and beyond. Thus, in the above example, a depth level of one (1) may be set so that data item X may be expanded to add data item Y (level 0), data item Y may be expanded to add data item Z (level 1), but data item Z may not be expanded because X's expansion rules set a maximum expansion depth level of one (1), and further expansion would exceed the maximum depth level allowed. Zero (0) may be the default level if not specified, for example, and an entire device class/software version class may have a different default, or may have individually set maximum expansion levels.

Figure 7:
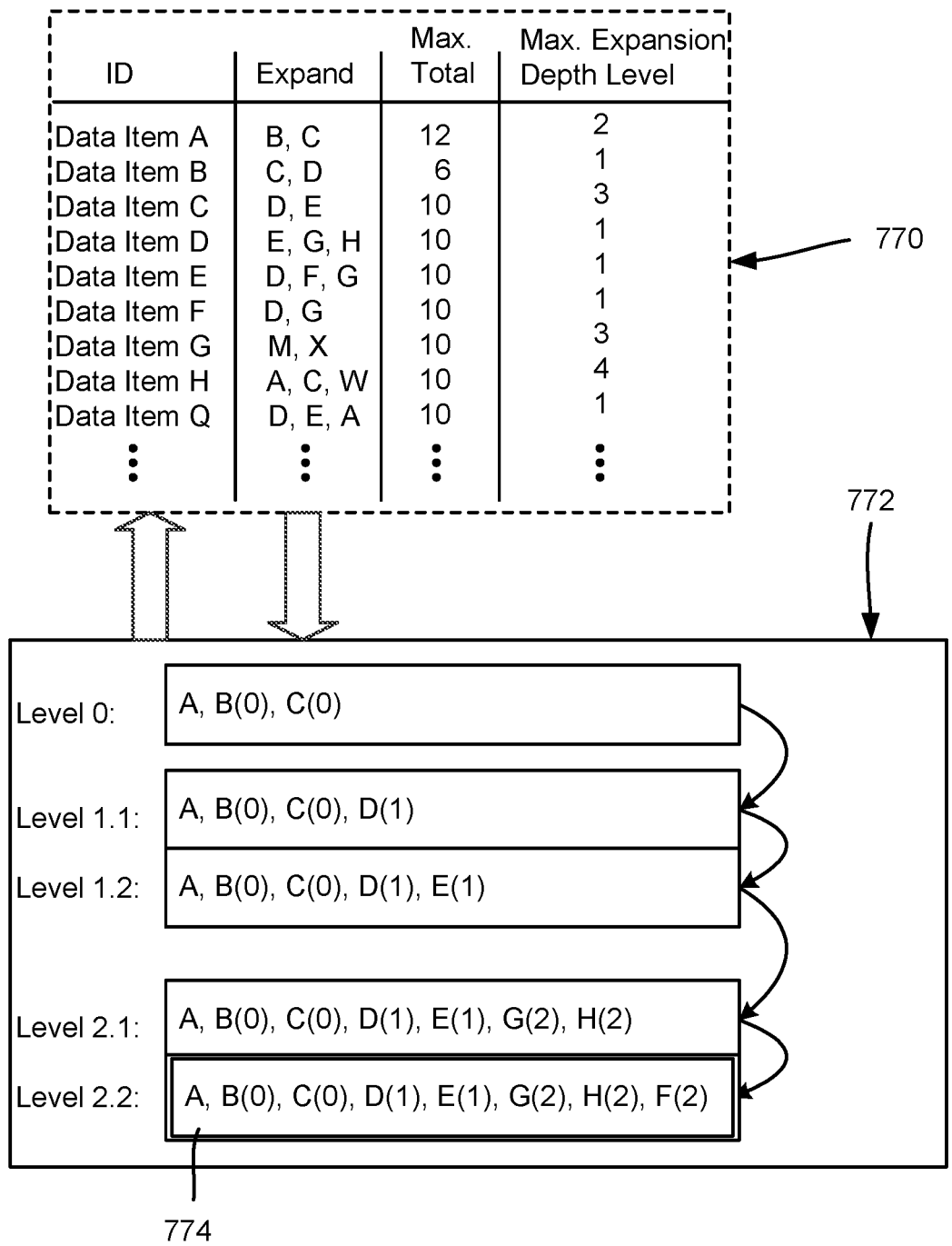
FIG. 7 is an example conceptual representation of expanding requests for data items (e.g., providers) into expanded requests, including expanding upon expanded data items, according to one or more example implementations.

FIG. 7 shows an example of such expansion levels and limits, in which the data items (e.g., providers or provider types) are identified via a single capital letter. For purposes of explanation, instead of showing each rule file separately, a table 770 summarizes the expansion rules for each data item, in terms of which other data item(s) to expand, a maximum total and a maximum expansion depth level. It is understood that such an actual table 770 need not exist, as the information may be specified in each data item's expansion rule file.

Thus, for an initial request for data item A, it is seen that as a first level zero (0) expansion, an expanded request set (e.g., a request/expansion data structure such as a list) 772 includes A, B(0) and C(0); (for purposes of explanation, the value in the parentheses after each expanded data item indicates the level at which that item was added). Because neither rule maximum (total of twelve or depth level of two) is met, expansion continues. Note that while a request/expansion list 772 is exemplified, it is understood that any suitable data structure may be used for the expanded request set, such as an array that lists data item identifiers along with including requested (or not yet) and returned (or not yet) status information.

At a first part of the level one (1) expansion, labeled 1.1 in FIG. 1, data item B(0) is expanded into data item D(1); note that data item C is not added again because it already is in the request/expansion list 772. At a second part of the level one (1) expansion, labeled 1.2 in FIG. 1, data item C(0) is expanded into data item E(1); note that data item D is not added again because it already is in the request/expansion list 772. Again, because neither rule maximum (total of twelve or depth level of two) is met, expansion continues.

At a first part of the level two (1) expansion, labeled 2.1 in FIG. 1, data item D(1) is expanded into data items G(2) and H(2); note that data item E is not added again because it already is in the request/expansion list 772. At a second part of the level two (2) expansion, labeled 2.2 in FIG. 1, data item E(1) is expanded into data item F(2); note that data item D is not added again because it already is in the request/expansion list 772. This time, because the maximum level of depth level of two is met, expansion stops; (had there been another level of expansion, non-duplicate expanded data items for G, H and F would be added, and so on). Thus, the final request/expansion list 774 (after to level 2.2 expansion) contains items [A, B, C, D, E, G, H and F].

Note that while expansion is occurring, the original data item (data item A) as well as other items from the list 774 may be requested and/or returned. For example, while retrieving its rule data, item A may be looked for in the caches, and further requested from the back-end data service if not cached/valid in the front-end cache, and the same with item B, C, and so on. As long as a client gets a response set that has data (or an error) for each requested data item, along with the data of any expanded data item according to the expansion rules, these example operations may be performed in any logical order and with intermediate operations such as lookups and requests made. Thus, the request/expansion list 774 list may be used for other purposes as it is being built, as long as each item remains identified (e.g., maintained while marked as requested and/or returned) for purposes of expansion. For example, when data item E is added by data item C's expansion, data item E may be requested, found in a data service cache and returned before data item E is expanded; data item E is thus not removed from the list, but rather only marked as requested and/or returned in some way. Keeping the item in the list after it has been requested/returned also prevents another data item from relisting the same data item (e.g., data item E) when that other data item gets expanded.

Figure 8:
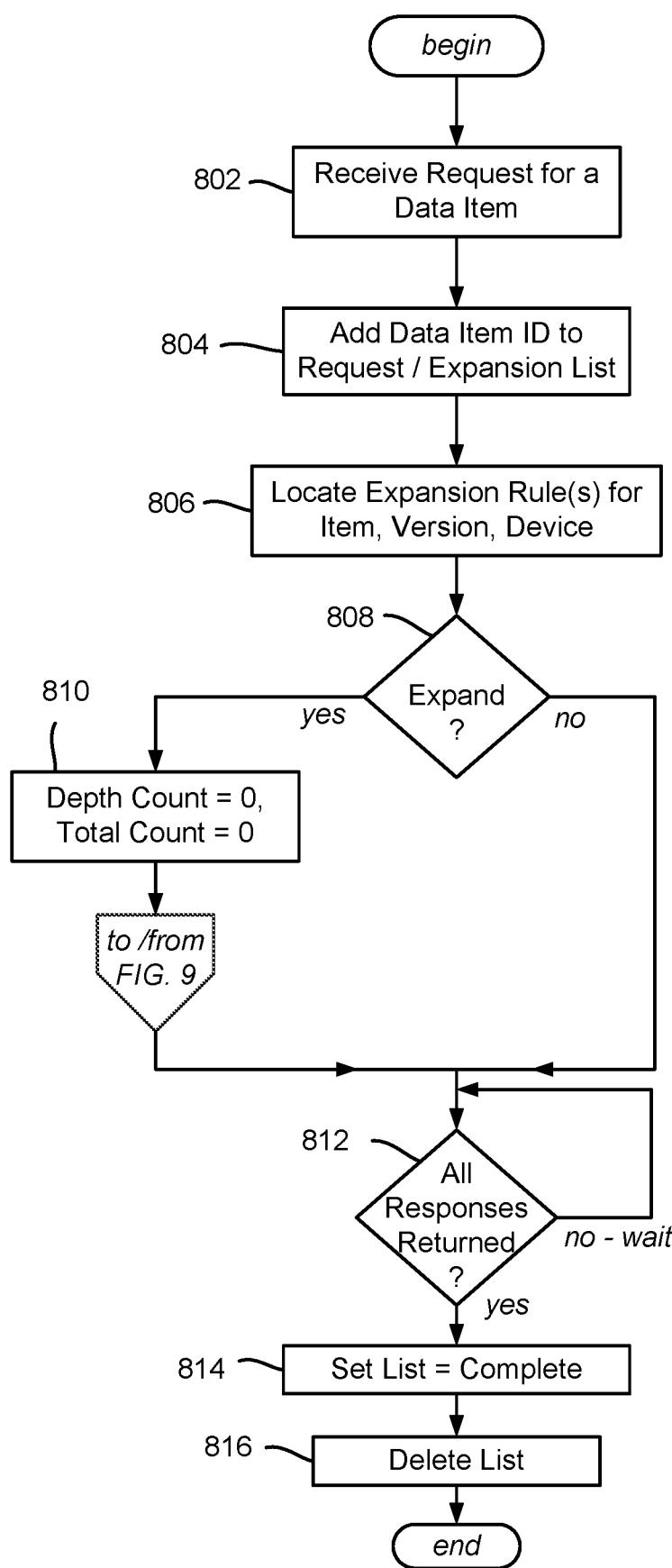
FIGS. 8-10 comprise a flow diagram showing example logic/steps that may be taken to expand a request for a data item into an expanded request set, according to one or more example implementations.
Figure 9:
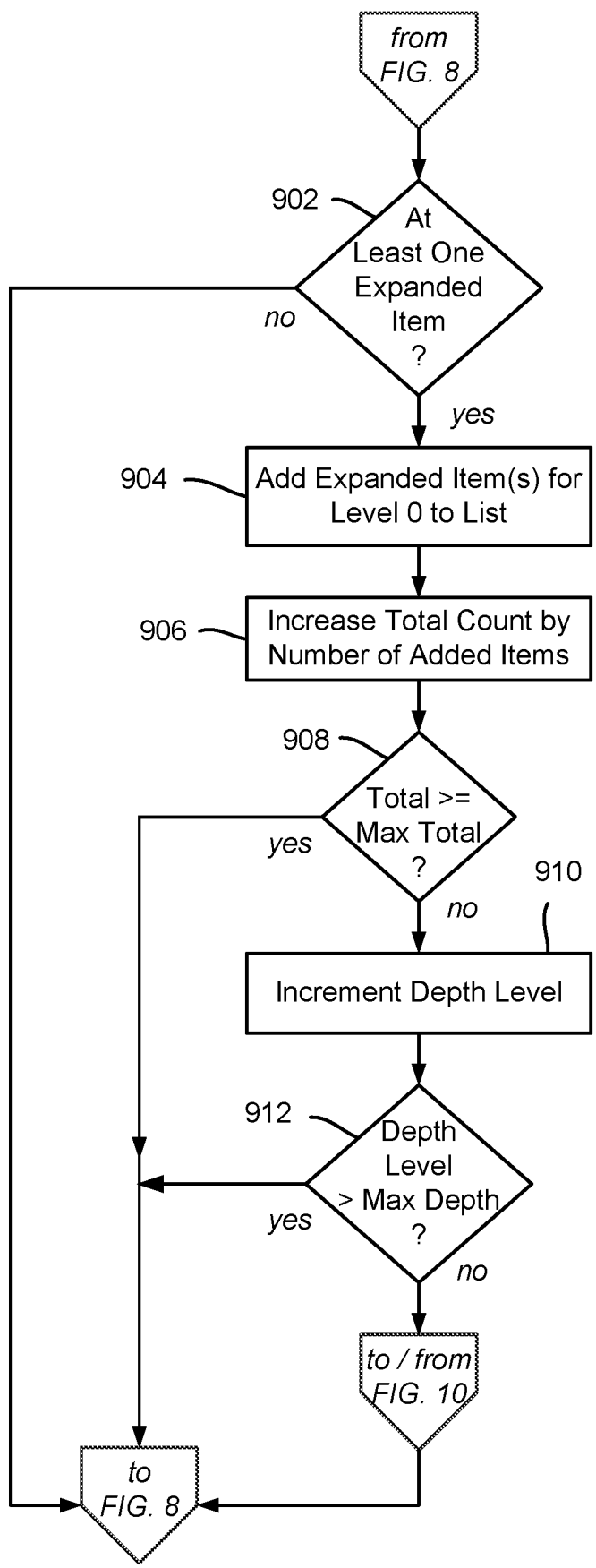
Figure 10:
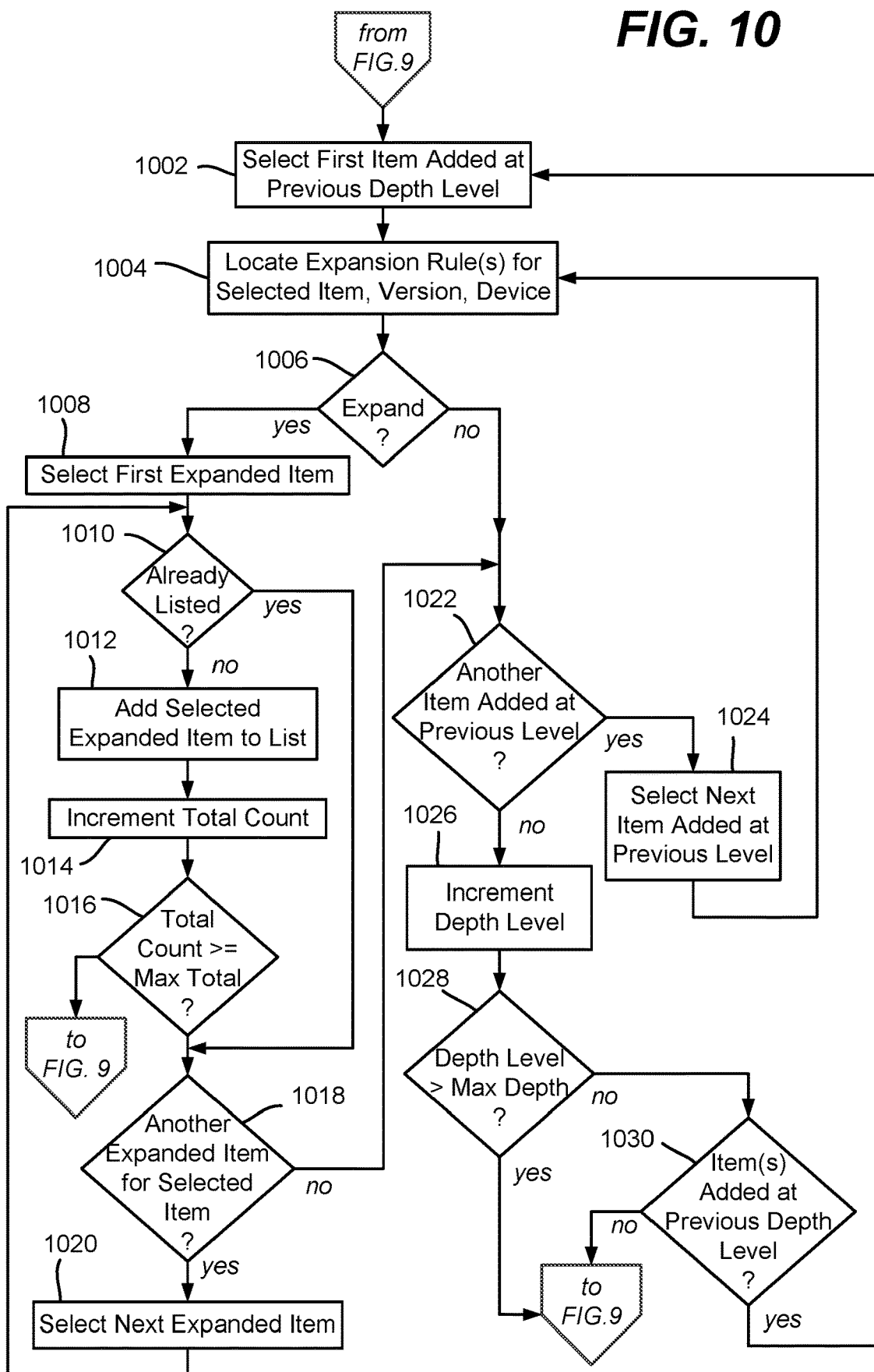

FIGS. 8-10 comprise a flow diagram showing example steps that may be taken by a data service (e.g., the front-end portion) to expand a query that is requesting a data item, e.g., a provider, beginning at step 802 where the request is received. Step 804 represents adding the requested data item to a request/expansion list.

Step 804 locates the expansion rule set (e.g., in a file as exemplified above) for the requested item. As described above, in addition to the item identity (or type), the rule that is located may be further based upon the device class and/or software version of the client platform. If the rule set for this data item indicates expansion, step 808 branches to step 810, which in this example initializes the limit counters for limiting expansion.

Note that depending on the implementation in use, there may or may not be an expansion rule set (e.g., a rule file) for the data item, or there may be a rule set that indicates no expansion is to be performed for this data item (or type), device class and/or software version. In any event, the logic determines whether expansion is to occur for a data item or not. If no expansion is to occur, step 808 branches to step 812 where expansion is complete, and the process waits for data item(s) on the list to be requested and responded to, as described below with reference to FIGS. 11 and 12.

Consider that in this example the data item is to be expanded, and thus after initialization at step 810, expansion occurs, as exemplified with reference to FIGS. 9 and 10. Step 902 evaluates the rule set to determine whether there is at least one data item with which to expand the request. Note that this determination may be performed at step 808, however in this example step 902 may consume more resources than step 808's straightforward evaluation of whether to expand or not, e.g., by having step 902 consider whether the rule itself, which may include complex logic, may be preventing expansion; (e.g., expand data item X with data items Y and Z if between 5:00 pm and 11:00 pm AND the day is a Monday through Friday, else do not expand). It is also possible that an expansion rule set exists that by error does not identify any items to use in expansion. If at step 902 processing the rule indicates that expansion is to occur but for whatever reason there is no data item to request, step 902 returns to FIG. 8, step 812 as described above.

In a situation in which the expansion rule identifies at least one expanded data item, step 902 branches to step 904 where each expanded data item is added to the request/expansion list for the initially requested data item. In the above example of FIG. 7, if data item A was the initial request, step 904 adds data items B and C at expansion level zero (0).

In an implementation that limits expansion to a maximum number of items (e.g., by default unless overridden by the rule's data), step 906 increases the total count based upon the number added at step 904, and step 908 evaluates whether the addition of the items equals or exceeds the maximum. If the maximum is reached, expansion is complete, and the process returns to FIG. 8, step 812 as described above. Note that steps 904, 906 and 908 assume that the rule does not specify to add more items than the maximum set by default or as overridden by the rule itself; if this is not certain, e.g., an indeterminate number of expansion items are possible (such as because rule logic may allow a variable number of items to be added, and/or a rule may nest another rule, and so on), then expanded items may be added one at a time until none remain to add or the maximum is reached; alternatively the list may be truncated or the like so that the number of expanded items is limited.

Consider that in this example the maximum total is not met at step 908, whereby the data item or items directly identified by the rule at expansion level zero (0) are each added to the list. Step 910 increases the expansion depth level, with the depth level value is evaluated at step 912, which in this example is from zero (0) to one (1); (note that FIG. 9 may simply check for whether the maximum depth level is zero, or alternatively may branch to step 1026 of FIG. 10, however steps 910 and 912 are exemplified for purposes of clarity). If the maximum expansion depth level is exceeded at step 912, then expansion is complete and the process returns to FIG. 8, step 812 as described above. Otherwise, more expansion is possible, using the expanded items as the source items for further, indirect expansion.

FIG. 10 shows example steps for such indirect expansion, beginning at step 1002 where the first data item added at the previous expansion level is selected for (possible) further expansion. Step 1002 expects that at least one data item was added at the previous expansion level, (which step 902 ensured). In the above example of FIG. 7, if data item A was the initial request, and data items B and C were added by level zero expansion, then data item B is selected at step 1002.

Step 1004 locates the expansion rule set for this selected data item, e.g., a rule file as described herein. Step 1006 evaluates whether the data item's rule set indicates that there is to be an expansion of this data item. If not, step 1006 branches to steps 1022 and 1024 to select the next data item, if any, added at the previous level, and so on. If the selected data item is to be expanded, step 1006 branches to step 1008.

Step 1008 selects the first expanded data item to be added (relative to the currently selected data item). If already listed in the request/expansion list, step 1010 bypasses this expanded data item's addition. In this way, in the above example of FIG. 7, data item C is not added by data item B's indirect expansion because data item A already added data item C during data item A's direct expansion. Otherwise step 1010 branches to step 1012 to add the data item to the list. Step 1014 increments the total count for this addition, which 1016 evaluates against the total maximum, returning to FIG. 9 and then to FIG. 8 step 812 if the maximum is met and thus expansion is complete.

If not at the maximum count at step 1016, or because the addition was bypassed via step 1010, the process continues to step 1018, where an evaluation is made as to whether the currently selected data item to expand has another expansion data item. If so, this next data item is selected at step 1020, and the process returns to step 1010. In the above example of FIG. 7, this would be data item B's expanded data item D; as is understood, in FIG. 7's example data item D is not already listed, and thus is added at step 1012.

Consider that (as in the example of FIG. 7) the maximum total count is not reached, the currently selected item has no more expanded items to add at step 1018, and thus step 1022 is reached. Step 1022 evaluates whether another data item was added at the previous expansion depth level, which in the above example of FIG. 7 corresponds to data item C, added via data item A's direct expansion. If so, step 1024 selects this data item as the currently selected data item to expand, and returns to step 1004 as described above. Following the above example of FIG. 7 and the above-described steps of FIG. 10, it is readily appreciated that data item E is added at step 1012.

Once the data item(s) added at the previous expansion level are exhausted with respect to their expansion, (and the total maximum count is not yet reached), expansion at that level is done, and thus step 1022 branches to step 1026 which increments the current depth level. If at the maximum depth level, then expansion is complete, and the process returns to FIG. 9 and then to FIG. 8, step 812.

If expansion is to continue for at least one more expansion depth level, then step 1028 branches to step 1030 which evaluates whether at least one expanded data item was added at the previous level. If not, e.g., all data items were already listed, or the rules for those data items indicated not to expand, then there are no more data item(s) to expand, and expansion is complete, whereby the process returns to FIG. 9, and to FIG. 8, step 812.

In the above example of FIG. 7, data items D and E were added at expansion depth level one (1), and because the maximum expansion depth level of two (2) for data item A has not been exceeded, the process continues at expansion level two (2). Note that the total maximum and maximum expansion depth level are retained based upon the rule set for the original requested data item A; (although it is feasible to vary the maxima based upon the rule set for one or more of the other expanded data items, and/or to vary the total maximum based upon the current depth level, and so on, e.g., maximum of four items at depth level zero, three items at depth level one, six items at depth level two, and so on).

As can be understood by following the above described logic of FIG. 10 and the example of FIG. 7, at depth level two (2), more data items may be added at step 1012. In the example of FIG. 7, via data item D's expansion, the added data items are first data item G, then data item H, followed by data item E's expansion that adds data item F. This time the expansion is complete, because step 1026 increments the depth level to three (3) which exceeds the maximum expansion depth level of two (2), whereby the process returns to FIG. 9, then to step 812 of FIG. 8.

After expansion for this data item A (and for this client request) is complete, step 812 of FIG. 8 evaluates whether a response for all data items, including expanded data items, have been returned. Note that as set forth above, listed data items may be requested and/or returned as soon as listed (or an error returned, which may be a timeout error if the response takes too long). When returned, a data item is marked as returned, as described herein with reference to FIG. 12. If a response for each item has been returned, step 814 sets the list as having been completed (which indicates that all listed items have been handled and no more will be added via expansion), and step 816 deletes the request/expansion list. Otherwise the list is retained until a response is received for each request, as described herein with reference to FIGS. 11 and 12.

Figure 11:
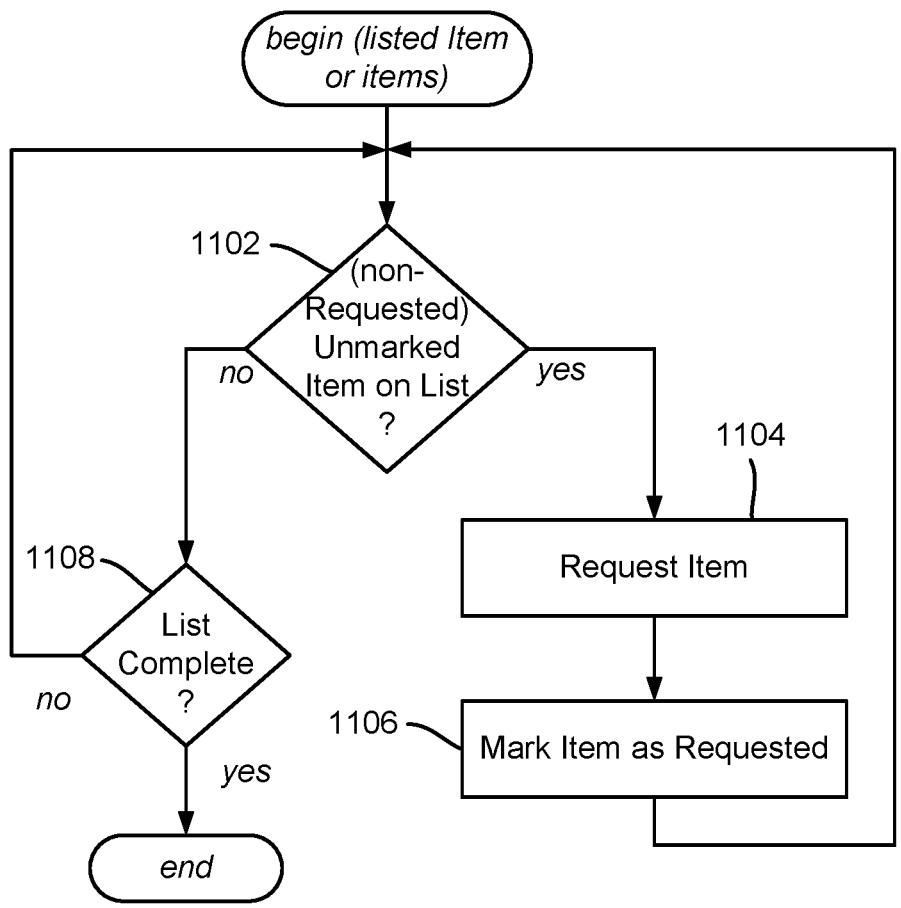
FIG. 11 is a flow diagram showing example logic/steps that may be taken with respect to requesting data items, including expanded data items, from an expanded request set, such as built via the example logic of FIGS. 8-10, according to one or more example implementations.

FIG. 11 represents requesting data items from the list, which as set forth above may occur once the list is started (e.g., at step 804 of FIG. 8) and continue while expansion is taking place, (although it is an alternative to wait to make requests until the entire request/expansion list is built; if so, it may be practical to make the initial request right away, before processing for expansion, so that the client gets back the actual requested data as soon as possible). Step 1102 evaluates whether there is a request for a data item on the list that has not yet been requested, e.g., is unmarked with respect to requesting it. If so, at step 1104 the item is requested, and marked as having been requested at step 1106. Step 1106 returns to step 1102 to look for another non-requested data item. Note that as set forth above, in this example items are not removed when requested (or returned), as they still may need to be expanded.

When each listed data item has been requested, step 1102 branches to step 1108 where an evaluation is made as to whether the list is complete, e.g., as set via step 814 of FIG. 8. If so, the requesting process ends, otherwise it "waits" for at least one more data item to request or for the list to complete. Note that such "waiting" may be event driven, may be asynchronous and so on, in that it does not block other operations (including the completion of expansion or the handling of responses).

Figure 12:
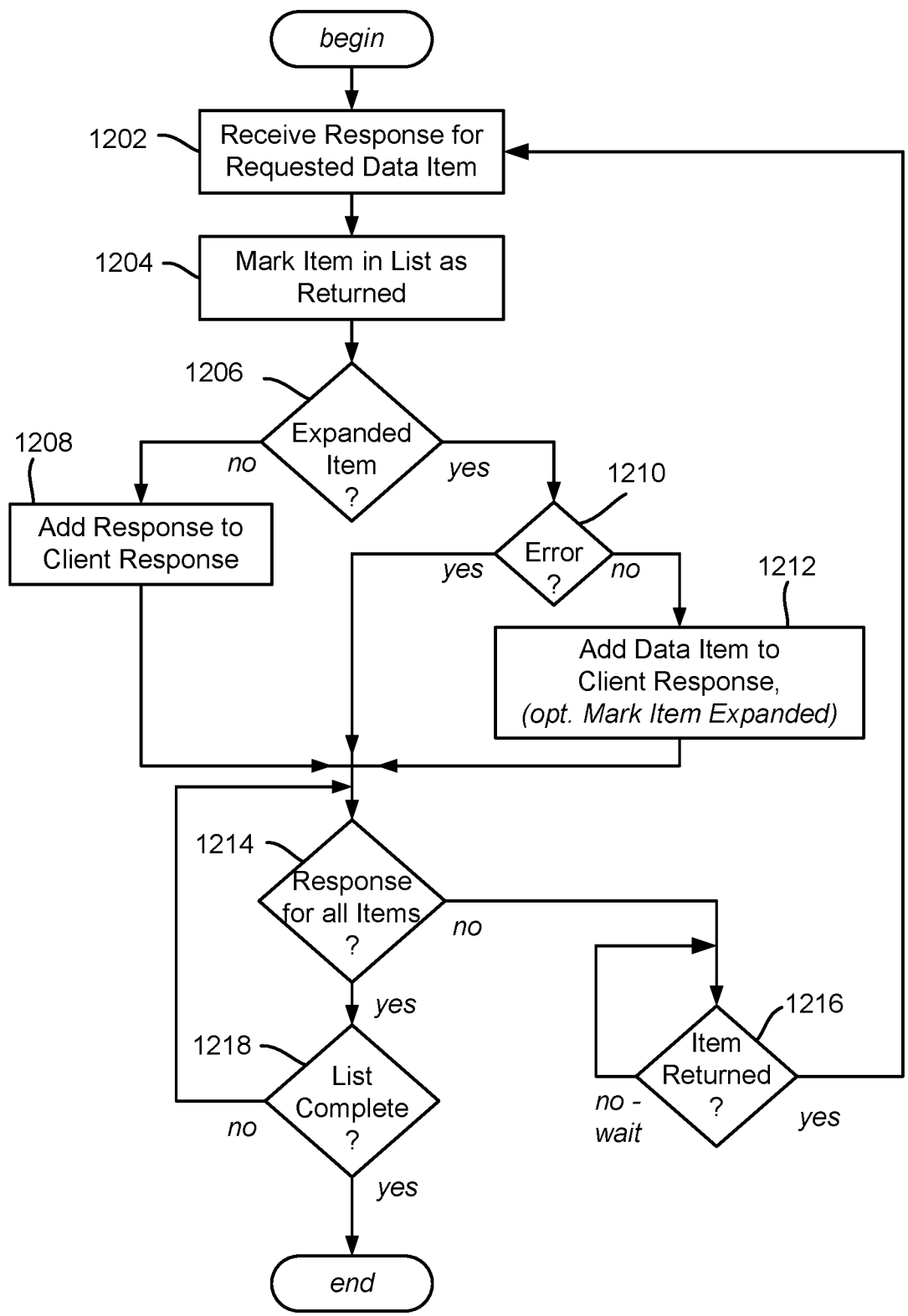
FIG. 12 is a flow diagram showing example logic/steps that may be taken with respect to receiving a response to a request, including a response to an expanded request, according to one or more example implementations.

FIG. 12 shows example steps related to handling a response to a requested data item; (if more than one data item is returned in a batch response, each data item may be tracked individually, for example). Step 1202 represents receiving the response, and step 1204 marks the item as having had a response returned for it.

Step 1206 evaluates whether the item is an expanded item; if not, at step 1208 the response is added to the client response, (which, for example, may be sent as soon as ready, or batched and sent at some regular rate, or the like). If an expanded item, and the response is an error (step 1210), the response may be discarded. Otherwise step 1212 adds the response to the client response for returning to the client. As described herein, one option is to mark the item as an expanded item so that the client knows not to hydrate the data item unless and until needed. Another option is to send the client the expanded data item with no indication that it is expanded; in such an implementation, the client may cache each data item in the partially hydrated state, and track which ones are actual requests that need to be hydrated into object form for returning data therefrom to a requesting entity.

Further, depending on a given implementation, it is understood that step 1206 may not evaluate whether an item is expanded. Instead, the client software may be configured to discard items that were errors but were not directly requested. Indeed, in an implementation in which clients cache partially hydrated data items for both requested and expanded data items, and discard errors for expanded (not directly requested) data items, steps 1206, 1210 and 1212 are not needed.

Step 1214 evaluates whether each item is marked as having had a response returned for it. If not, step 1216 waits for another response, and repeats the process when one is returned (again, such waiting is in a non-blocking manner).

If all requested items have a response returned, step 1218 evaluates whether the list is complete. If so, the response handling process ends. Otherwise step 1218 (along with steps 1214 and 1216) waits, because there is a possibility that expansion is still ongoing that may add another item to the list. At some point the list completes (step 1218) or another item response is returned (step 1216).

Note that instead of (or in addition to) expanding a query to thereby obtain expanded data, it is an alternative to have the response suggest expansion or automatically return expanded data. In general, instead of (or in addition to) having a rule determine expansion of a query, the data item itself may specify expansion, or at least suggest expansion. For example, the response to a request for data item X may return the data for X as well as information that indicates that items Y and Z are suggested expanded items with respect to item X; (an alternative is to automatically return items Y and Z as data items associated with X's response). Rules or the like may then be used to determine whether to also get and return data items Y and Z (if not automatically returned) and/or whether to return them (or one of them) to a client. Such an alternative allows the party responsible for a data item to specify expansion item(s), rather than an expansion rule author.

As can be seen, described herein is a technology that provides for expanding the response to a request for a data item with an expanded data item set of one or more expanded data items. To obtain the expanded data item set, the request for the data item may be expanded, based upon the data item (e.g., its identifier or type), and client-specific information including client device type and/or client platform software version. The client device caches such expanded data items, which tends to reduce further internet requests for data items and also improves the client user experience by having data locally stored at the client device for rapid retrieval.

One or more aspects are directed towards receiving, at a data service, a client request for an identified data item from a client device. The identified data item is returned from the data service to the client device in response to the client request. The data service determines whether to return an expanded data item set based upon the identified data item, and if so, returns the expanded data item set from the data service to the client device.

An expanded data item set may be returned from the data service to the client device, including by expanding the client request for the identified data item to include a request for the expanded data item set. Receiving the client request for the identified data item may include receiving a request for a provider node of a client graph.

Determining whether to return the expanded data item set may include determining a type of the data item. This may include processing an identifier of the data item into a regular expression, and matching the regular expression against an array or regular expressions, including regular expression corresponding to the type of the data item.

Determining whether to return the expanded data item set may include accessing an expansion rule based upon an identifier of the data item and a device type of the client device. Accessing the expansion rule may include accessing an expansion rule file, including using information based upon the identifier of the data item as a file name, and using information based upon the device type to determine a set of one or more file system folders for locating the expansion rule file. Determining whether to return the expanded data item set may include accessing an expansion rule based upon an identifier of the data item, a device type of the client device, and a software version of client platform software that is requesting the identified data item; accessing the expansion rule may include accessing an expansion rule file, including using information based upon the identifier of the data item as a file name and using information based upon the software version and the device type to determine a set of one or more file system folders for locating the expansion rule file.

An expanded data item from the data service to the client device may be returned in the expanded data item set, along with another expanded data item returned from the data service to the client device, in which the other expanded data item is based upon an expansion of the expanded data item.

When an expanded data item set is returned from the data service to the client device, the client device may cache each expanded data item in the expanded data item set in an unparsed state.

One or more aspects are directed towards request handling logic of a data service, in which the request handling logic is configured to receive client requests for data items and to return responses to the client requests, including to receive a client request for an identified data item. Expansion rule logic coupled to the request handling logic locates information in an expansion rule set corresponding to the identified data item, and based upon the information in the expansion rule set, determines that the identified data item corresponds to a request for an expanded data item set comprising at least one other data item. The request handling logic obtains the identified data item and each expanded data item of the expanded data item set and returns the identified data item and the expanded data item set in response to the client request.

The request handling logic may attempt to obtain the identified data item and each expanded data item of the expanded data item set from a data service cache set (one or more data service caches), and for any data item not obtained from the data service cache set, from one or more backing data sources.

The request for the identified data item may include a request for a data provider corresponding to a node of a client graph. The client request for the identified data item may be part of a batch request for a plurality of providers.

The expansion rule logic may locate the information in the expansion rule set from an expansion rule file that is selected based in part upon the identified data item, and in part upon client-specific information. The client-specific information may include a client device type and/or a client platform software version.

The expansion rule logic adds identifiers of data items from the expanded data item set to a data structure. The data structure may be used by the request handling logic to obtain each expanded data item of the expanded data item set.

One or more aspects are directed towards receiving a request for an identified data item from a client device and locating a rule set corresponding to the identified data item. Aspects include determining from the rule set that an expanded request for one or more expanded data items is to be made, obtaining the identified data item and the one or more expanded data items, and returning a response set to the client device, including the identified data item and the one or more expanded data items.

Locating the rule set corresponding to the identified data item may include generating a regular expression from an identifier of the identified data item, accessing a set of regular expressions to match the regular expression to a rule name, determining a folder path lookup set based upon client-specific information, and obtaining a file corresponding to the rule name within the folder path lookup set.

Other aspects may include adding an expanded data item to an expanded request set, expanding that expanded data item into at least one other expanded data item, and adding the at least one other expanded data item to the expanded request set. The amount of expanded data items added to the expanded request set may be limited.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 13 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
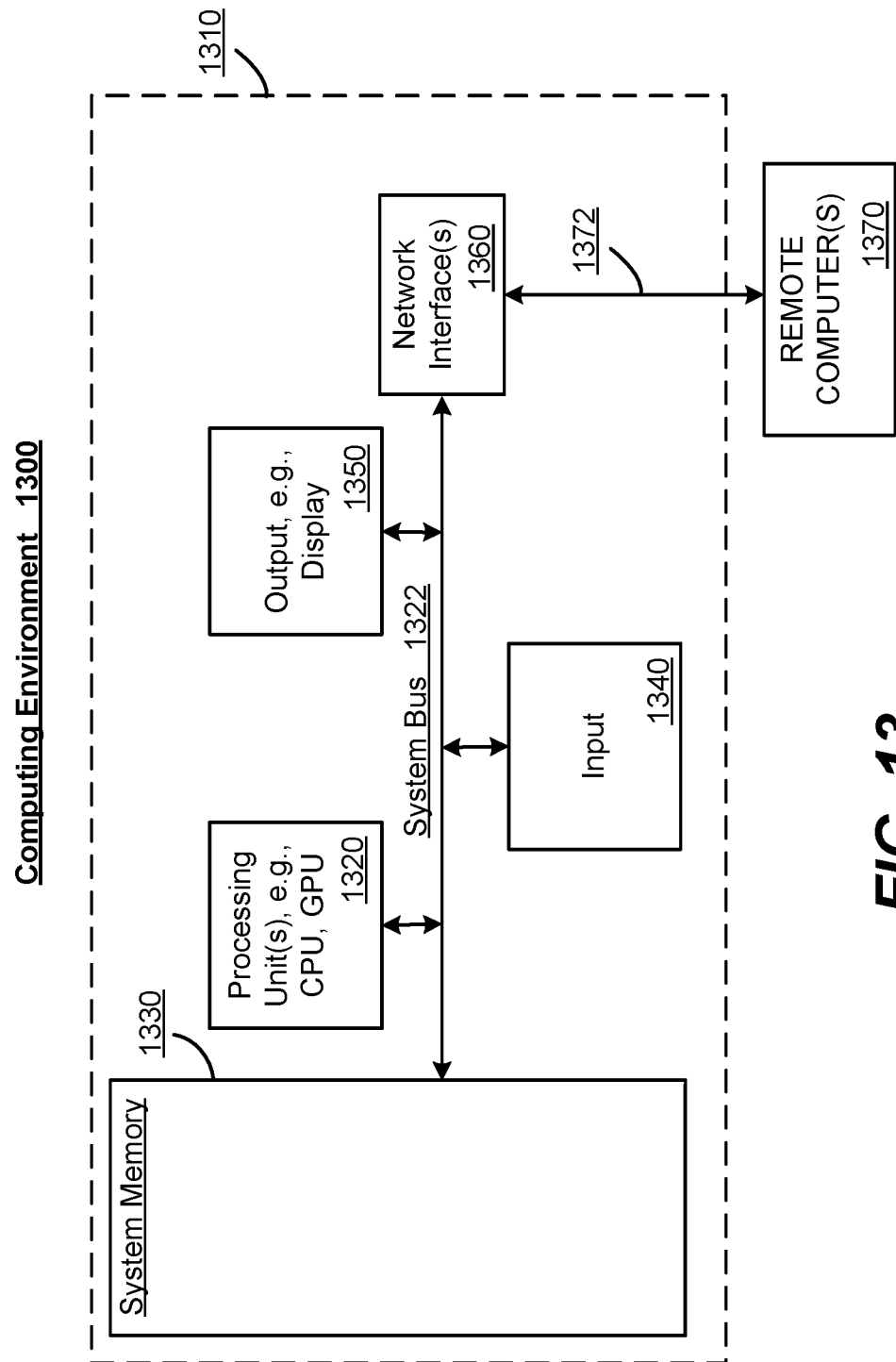
FIG. 13 is a block diagram representing an example computing environment into which aspects of the subject matter described herein may be incorporated.

FIG. 13 thus illustrates an example of a suitable computing system environment 1300 in which one or aspects of the implementations described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the example computing system environment 1300.

With reference to FIG. 13, an example device for implementing one or more implementations includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of machine (e.g., computer) readable media and can be any available media that can be accessed by a machine such as the computer 1310. The system memory 1330 may include computer storage media in the form of volatile and/or nonvolatile memory such as read only memory (ROM) and/or random access memory (RAM), and hard drive media, optical storage media, flash media, and so forth. By way of example, and not limitation, system memory 1330 may also include an operating system, application programs, other program modules, and program data.

A user can enter commands and information into the computer 1310 through one or more input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system comprising:
    a processor; and
    a memory that stores executable instructions that, when executed by the processor, facilitate performance of operations, the operations comprising:
        receiving a request from a client device for an identified data item; and
        in response to the request:
            obtaining the identified data item;
            accessing expansion rule data based on the identified data item,
                wherein the expansion rule data defines a maximum depth level within a hierarchy of depth levels, the hierarchy comprising a primary depth level,
                wherein the expansion rule defines whether any number of one or more additional depth levels, up to the maximum depth level, and beyond the primary depth level are to be executed, and
                wherein each individual successive depth level beyond the primary depth level comprises at least one data item based on at least one data item comprised by an immediately prior depth level;
            determining from the expansion rule data that the identified data item is associated with expanded data items;
            obtaining a subset of the expanded data items, based on the expansion rule data, comprising a defined quantity of the expanded data items,
                wherein the defined quantity is customized based on an amount of memory in the client device that sent the request, and
                wherein the defined quantity satisfies the primary expansion level; and
            communicating with the client device to return the identified data item and the subset of the expanded data items for building a client graph on the client device, the building comprising populating a cache with first data corresponding to the identified data item and second data corresponding to the subset of the expanded data items.

2. The system of claim 1, wherein the request is associated with device type information, and wherein the operations further comprise formatting the first data based on the device type information and formatting the second data based on the device type information prior to populating the cache with the first data and the second data.

3. The system of claim 1, wherein the request is associated with software version information, and wherein the operations further comprise formatting the first data based on the software version information and formatting the second data based on the software version information prior to populating the cache with the first data and the second data.

4. The system of claim 1, wherein the request is associated with device type information and software version information, and wherein the operations further comprise formatting the first data based on the device type information and the software version information prior to populating the cache with the first data, and formatting the second data based on the device type information and the software version information prior to populating the cache with the second data.

5. The system of claim 1,
    wherein the expanded data items comprise a first expanded data item, and wherein the operations further comprise obtaining a second expanded data item based on the first expanded data item, and populating the cache with third data corresponding to the second expanded data item, and
    wherein the obtaining the second expanded data item based on the first expanded data item comprises satisfying a secondary depth level, hierarchally in succession to the primary depth level, that is defined as allowable by the expansion rule data.

6. The system of claim 1, wherein the determining from the expansion rule data that the identified data item is associated with the expanded data items comprises processing an identifier of the identified data item into a regular expression, and matching the regular expression against an array of regular expressions to locate the expansion rule data.

7. The system of claim 1, wherein the populating the cache with the second data corresponding to the subset of the expanded data items comprises populating the cache with the second data in a partially hydrated state.

8. The system of claim 1, wherein the populating the cache with the second data corresponding to the subset of the expanded data items comprises populating the cache with the second data in a dehydrated state.

9. The system of claim 1, wherein the identified data item corresponds to a user interface element representing selectable video content.

10. The system of claim 1, wherein the identified data item corresponds to a first user interface element representing a menu of selectable video content, and wherein the expanded data items corresponds to second user interface elements representing selectable video content associated with the menu.

11. The system of claim 1, wherein the operations further comprise generating a set of file system folder paths, by a lookup composer of the system, wherein the paths are ordered based upon specificity of expansion rule data comprised by the file system folders, and
wherein accessing expansion rule data comprises walking the set of file system folder paths.

12. A method, comprising:
receiving, by a system comprising a processor, a request for an identified data item corresponding to first provider data, the request associated with client-specific information of a client device that sent the request; and
in response to the request for the identified data item,
determining an expansion rule to be employed relative to the identified data item,
wherein the expansion rule defines whether any number of one or more additional depth levels, up to the maximum depth level, and beyond a primary depth level, are to be executed;
obtaining first data corresponding to the identified data item from a cache;
determining, based on the client-specific information, that the identified data item is part of an expanded data item set;
obtaining second data comprising second provider data and corresponding to a subset of the expanded data item set,
wherein the subset comprises a defined quantity of expanded data items of the expanded data item set, based on the expansion rule,
wherein the defined quantity is customized based on an amount of memory in the client device,
wherein the expansion rule defines a maximum depth level, within a hierarchy of depth levels, for expansion beyond the identified data item,
wherein each depth level comprises at least one data item based on at least one data item of an immediately prior depth level, and
wherein the subset satisfies a primary depth level of the expansion rule; and
returning the first data and the second data for the client device to build a client graph based on the first data and the second data.

13. The method of claim 12, wherein the client-specific information comprises device type information, and wherein the determining, based on the client-specific information, that the identified data item is part of the expanded data item set comprises accessing expansion rule data based on an identifier of the identified data item and the device type information.

14. The method of claim 12, wherein the client-specific information comprises software version information, and wherein the determining, based on the client- specific information, that the identified data item is part of the expanded data item set comprises accessing expansion rule data based on an identifier of the identified data item and the software version information.

15. The method of claim 12, wherein the client-specific information comprises device type information and software version information, and wherein the determining, based on the client-specific information, that the identified data item is part of the expanded data item set comprises accessing expansion rule data based on an identifier of the identified data item, the device type information and the software version information.

16. The method of claim 12, wherein the obtaining the second data corresponding to the subset of the expanded data item set comprises accessing the second data from the cache, and
wherein the returning of the second data in response to the request comprises returning the second data in an unparsed state.

17. The method of claim 12, wherein the method further comprises generating a set of file system folder paths, by a lookup composer, wherein the paths are ordered based upon specificity of expansion rules defined by data comprised by the file system folders, and
wherein determining an expansion rule comprises walking the set of file system folder paths.

18. A non-transitory computer-readable medium having machine-executable instructions stored thereon that when executed by a processor perform operations, the operations comprising:
receiving a request for an identified data item corresponding to a first user interface element that represents first selectable video content; and
in response to the request for the identified data item,
accessing a rule set corresponding to the identified data item,.
wherein the rule set defines a maximum depth level within a hierarchy of depth levels, the hierarchy comprising a primary depth level,
wherein the rule set defines whether any number of one or more additional depth levels, up to the maximum depth level, and beyond the primary depth level, are to be executed, and
wherein each individual successive depth level beyond the primary depth level comprises at least one data item based on at least one data item comprised by an immediately prior depth level;
determining from the rule set that the identified data item is associated with expanded data items corresponding to second user interface elements that represent second selectable video content;
obtaining first data corresponding to the identified data item and, based on the rule set, obtaining second data corresponding to a subset of the expanded data items,
wherein the subset comprises a defined quantity of the expanded data items,
wherein the subset has been filtered by the device that sent the request to eliminate duplicate data, and
wherein the defined quantity is customized based on an amount of memory in a device that sent the request; and
returning a response, the response comprising the first data and the second data for use in building a client graph, on the device, and the response omitting duplicate data from the subset.

19. The non-transitory computer-readable medium of claim 18, wherein the returning the second data in response to the request comprises returning the second data in an unparsed state.

20. The non-transitory computer-readable medium of claim 18, wherein the request is associated with device type information and software version information, and wherein the accessing the rule set corresponding to the identified data item comprises locating the rule set based on an identifier of the identified data item, the device type information and the software version information.

\* \* \* \* \*